United States Patent
Okajima et al.

(10) Patent No.: US 10,357,717 B2
(45) Date of Patent: *Jul. 23, 2019

(54) GAME SYSTEM AND GAME PROGRAM

(71) Applicants: EARTHBEAT, INC., Shibuya-ku, Tokyo (JP); DWANGO Co., Ltd., Chuo-ku, Tokyo (JP)

(72) Inventors: Shigeo Okajima, Tokyo (JP); Kazuya Asano, Tokyo (JP); Hiroto Tamura, Tokyo (JP)

(73) Assignees: EARTHBEAT, INC., Shibuya-ku, Tokyo (JP); DWANGO Co., Ltd., Chuo-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/779,084

(22) PCT Filed: Jul. 26, 2016

(86) PCT No.: PCT/JP2016/071930
§ 371 (c)(1),
(2) Date: Aug. 24, 2018

(87) PCT Pub. No.: WO2017/090274
PCT Pub. Date: Jun. 1, 2017

(65) Prior Publication Data
US 2018/0345145 A1     Dec. 6, 2018

(30) Foreign Application Priority Data
Nov. 27, 2015 (JP) .................. 2015-231330

(51) Int. Cl.
*A63F 13/5378* (2014.01)
*G06F 3/0481* (2013.01)
(Continued)

(52) U.S. Cl.
CPC ........ *A63F 13/5378* (2014.09); *A63F 13/216* (2014.09); *A63F 13/332* (2014.09);
(Continued)

(58) Field of Classification Search
None
See application file for complete search history.

(56) References Cited

U.S. PATENT DOCUMENTS

2007/0200855 A1* 8/2007 Minagawa ............. A63F 13/00
345/474
2008/0146338 A1* 6/2008 Bernard ................. A63F 13/00
463/42

(Continued)

FOREIGN PATENT DOCUMENTS

JP  2001-070658 A  3/2001
JP  2003-000940 A  1/2003

(Continued)

OTHER PUBLICATIONS

International Search Report for PCT/JP2016/071930 dated Nov. 1, 2016.
PCT written opinion dated Nov. 1, 2016.

*Primary Examiner* — Robert T Clarke, Jr.
(74) *Attorney, Agent, or Firm* — Yokoi & Co., U.S.A.; Toshiyuki Yokoi

(57) ABSTRACT

To improve the user friendliness of switching a map display between the real world and a virtual world while also improving the entertainment value of the game and avoiding the danger arising from using a smartphone while walking. There are provided: a game progress processing unit that progresses a game; a real map storage unit that stores real map information about the real world; a virtual map information generation unit that generates virtual map information including coordination information for an object in virtual geographical information corresponding to geo- (Continued)

graphical information in the real map information; a position information acquisition unit that acquires a user's current position in the real world; a real display data generation unit that generates real display data indicating the user's current position in the user's real map information; a virtual display data generation unit that generates virtual display data in which a character is represented in the virtual map information corresponding to the user's current position on the basis of the user's current position acquired by the position information acquisition unit; and a display control unit that displays the real display data and the virtual display data.

10 Claims, 23 Drawing Sheets

(51) Int. Cl.
*G06F 3/01* (2006.01)
*A63F 13/332* (2014.01)
*A63F 13/428* (2014.01)
*G06T 19/00* (2011.01)
*G06T 19/20* (2011.01)
*G06T 17/05* (2011.01)
*A63F 13/216* (2014.01)
*A63F 13/65* (2014.01)
*A63F 13/52* (2014.01)

(52) U.S. Cl.
CPC ............ *A63F 13/428* (2014.09); *A63F 13/52* (2014.09); *A63F 13/65* (2014.09); *G06F 3/011* (2013.01); *G06F 3/04815* (2013.01); *G06T 17/05* (2013.01); *G06T 19/003* (2013.01); *G06T 19/20* (2013.01); *G06T 2219/2012* (2013.01)

(56) References Cited

U.S. PATENT DOCUMENTS

2010/0120535 A1    5/2010   Asami
2011/0172017 A1*   7/2011   Takahashi ............... A63F 13/06
                                                                                                463/39

FOREIGN PATENT DOCUMENTS

JP        2004-254721 A     9/2004
JP        2005-034216 A     2/2005

* cited by examiner

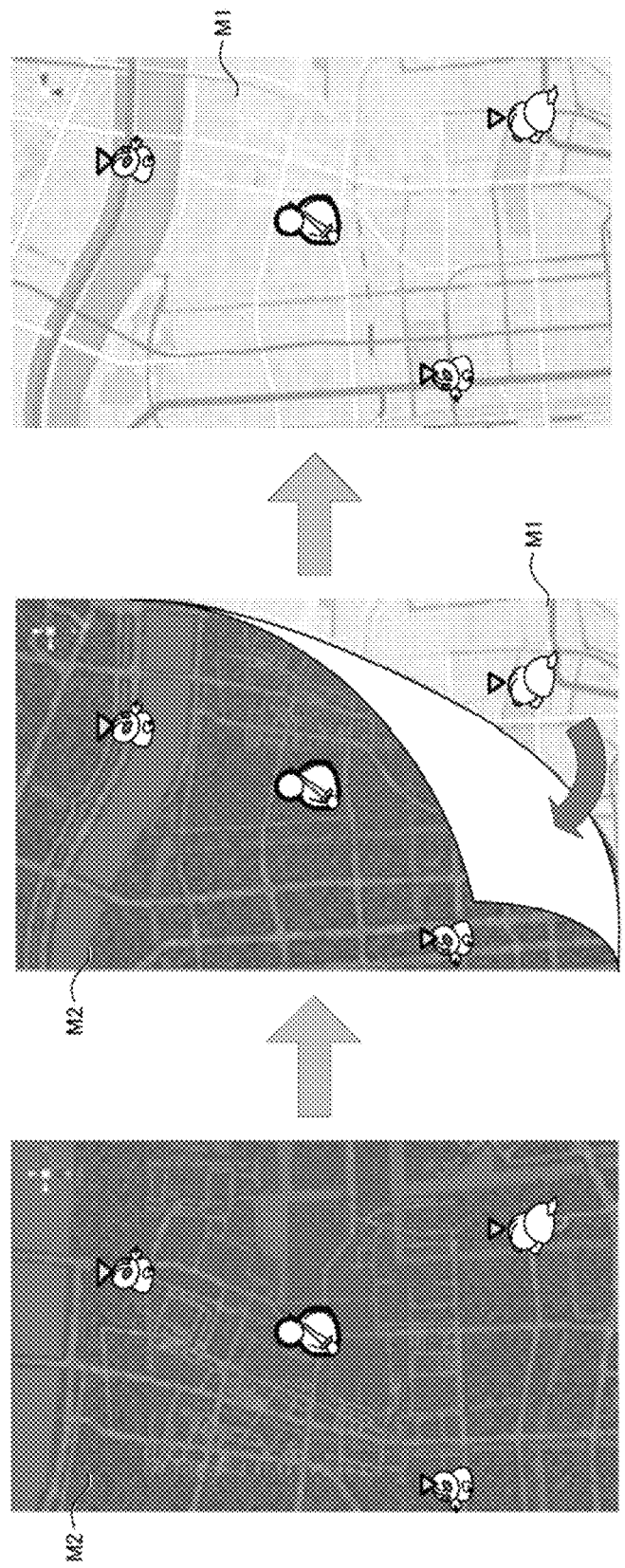

GAME SYSTEM AND GAME PROGRAM

FIELD OF THE INVENTION

The present invention relates to a game system and a game program for progressing a game in a virtual world where characters corresponding to users and other objects move to execute various event processes.

BACKGROUND ART

In recent years, portable information processing apparatuses capable of performing information communication through wireless communication, such as smartphones, cellular phones and mobile PCs, have spread with advanced multi-functionality while positional information services become available such as GPS.

In the past, various games have been proposed which make use of the portability of such information processing apparatuses and positional information services (for example, refer to Patent Document 1). The technique disclosed in this Patent Document 1 builds a game system which displays and controls a virtual position and a virtual displacement in a screen (virtual world) displayed by a role playing game in correspondence with a current position and a displacement thereof in a real world acquired on the basis of GPS or the like, and displays a second virtual world when the position overlaps with an event icon. It is therefore possible to realize a new entertainment by utilizing positional information and combining actual positional information with a conventional game system a non-conventional game system, and provide a system which make it possible that a walker can enjoy exercise by actually moving.

PRIOR ART LITERATURE

Patent Document

[Patent Document 1] Japanese Unexamined Patent Application Publication No. 2001-70658

SUMMARY OF INVENTION

Problems to Be Solved by the Invention

However, in the case of the system disclosed in the patent document 1, virtual positions and virtual displacements are displayed in a virtual world by a role playing game, so that there is a problem that practicability is low as a practical map viewer. Namely, when a user actually moves, a virtual world map is insufficient as map functionality for use during actually walking, and there is a request to enable confirmation with a real world map. Meanwhile, since a conventional information terminal is provided with a general map viewer application, a user can switch between a game application and such a general map viewer application to meet the request. However, while such switching operation is troublesome, it lowers the entertainment property of the game with which the user can enjoy the gap between the real world and a virtual world.

In addition to this, recently, walking while watching an information terminal, i.e., the so-called "walking while on the smartphone" becomes a social problem. In the case of a game system which simply displays a virtual world and requires a troublesome operation for displaying the real world, a user tends to steadily watch the screen of a mobile terminal device for a longer time to lead the user to walking while on the smartphone so that such a game requiring actual movement seems to have a risk.

It is therefore an object of the present invention to provide a game system and a game program for a game system which performs various event processes to progress a game in a virtual world where characters corresponding to users and other objects move, wherein the operability of switching a map display between the real world and a virtual world is improved to shorten, as much as possible, the time during which the user steadily watches a display screen and avoid the danger arising from using a smartphone while walking in order to maintain the entertainment value of the game.

Means to Solve the Problems (1) Game System

In order to accomplish the object as described above, the present invention is characterized by a game system which invokes various event processes to progress a game in a virtual world where a character corresponding to a user and other objects move, and comprises:

a game progress processing unit which progresses the game by invoking the various event processes;

a real map storage unit which stores real map information containing geographical information in a real world;

a virtual map information generation unit which generates virtual map information including coordinate information of the objects on virtual geographical information corresponding to the geographical information on the real map information in accordance with a game progress by the game progress processing unit;

a positional information acquisition unit which acquires a current coordinate position of the user and a displacement thereof in the real world;

a real display data generation unit which generates real display data indicating the coordinate position selected by the positional information acquisition unit on the real map information on the basis of the current coordinate position of the user and the displacement thereof;

a virtual display data generation unit which generates virtual display data showing the character on the virtual map information corresponding to the coordinate position acquired by the positional information acquisition unit on the basis of the coordinate position; and a display control unit which displays both or selected one of the virtual display data generated by the virtual display data generation unit and the real display data generated by the real display data generation unit, or displays part of either one overlapping the other, the game progress processing unit regulates the progress of the game in accordance with movement of the coordinate position.

(2) Game Program

On the other hand, the present invention is characterized also by a game program for use in a game system which performs various event processes to progress a game in a virtual world where a character corresponding to a user and other objects move, and for causing a mobile terminal device used by the user to function as:

a game progress processing unit which progresses the game by invoking the various event processes;

a real map storage unit which stores real map information containing geographical information in a real world;

a virtual map information generation unit which generates virtual map information including coordinate information of the objects on virtual geographical information corresponding to the geographical information on the real map information in accordance with a game progress by the game progress processing unit;

a positional information acquisition unit which acquires a current coordinate position of the user and a displacement thereof in the real world;

a real display data generation unit which generates real display data indicating the coordinate position selected by the positional information acquisition unit on the real map information on the basis of the current coordinate position of the user and the displacement thereof;

a virtual display data generation unit which generates virtual display data showing the character on the virtual map information corresponding to the coordinate position acquired by the positional information acquisition unit on the basis of the coordinate position; and a display control unit which displays both or selected one of the virtual display data generated by the virtual display data generation unit and the real display data generated by the real display data generation unit, or displays part of either one overlapping the other, wherein the game progress processing unit regulates the progress of the game in accordance with movement of the coordinate position.

Incidentally, the system as described above in accordance with the present embodiment and the control method for use in this system can be implemented in a computer by running a program of the present invention described in a predetermined language. Namely, the system having the functionality as described above can be implemented by installing the program of the present invention in an IC chip or a memory device of a mobile terminal device, a smartphone, a wearable terminal, a mobile PC, another type information processing terminal, or a general purpose computer such as a personal computer or a server computer, and running the program on the CPU.

Also, the program of the present invention can be distributed, for example, through a communication line, or as a package application which can be run on a stand-alone computer by storing the program in a computer readable storage medium. Such a storage medium includes a magnetic recording medium such as a flexible disk or a cassette tape, an optical disc such as CD-ROM or DVD-ROM, a RAM card and a variety of storage mediums. In addition, in accordance with the computer readable medium in which this program is stored, the above system and method can be easily implemented with a general purpose computer or a dedicated computer, and the program can be easily maintained, transported and installed.

(3) Respective Configurations

In the case of the above invention, the game progress processing unit gives value information to the user in accordance with progress of the game, wherein the game progress processing unit can reduce a given value of the value information or the opportunity of giving the value information, or take away the value information which have been given.

In the case of the above invention, the display control unit can regulate the display of the real display data and/or the virtual display data or the operation of displaying the same in accordance with regulation of the progress of the game by the game progress processing unit.

In the case of the above invention, the mobile terminal device is caused to function further as:

an event control unit which monitors the event process invoked by the game progress processing unit and the moving speed of the current position acquired by the positional information acquisition unit, and suspends a predetermined suspendable event process when the moving speed of the current position is no lower than a predetermined value and when the event process invoked by the game progress processing unit is the suspendable event process, wherein the game progress processing unit progresses the game by invoking another event process while suspending the event process to be suspended.

In the case of the above invention, preferably, the value information is a right to acquire privilege information associated with any of a predetermined coordinate position, an area or a route on the real map information or the virtual map information, wherein the condition for acquiring the privilege information is that the frequency of accessing the any of the predetermined coordinate position, the area or the route is no smaller than a predetermined value.

Effects of the Invention

As has been discussed above, in accordance with the present invention, for a game system which performs various event processes to progress a game in a virtual world where characters corresponding to users and other objects move, it is possible to improve the operability of switching a map display between the real world and a virtual world and the entertainment property of the game, and avoid the danger arising from using a smartphone while walking.

BRIEF DESCRIPTION OF THE DRAWINGS

FIG. 9A, FIG. 9B and FIG. 9C are explanatory views for showing a modification example (for switching by a swipe operation) of the display control in accordance with the embodiment.

FIG. 27A shows determination of a trail by connecting each adjacent points with the shortest line, and FIG. 27B shows determination of a trail along a course between two points.

FIG. 28A shows determination of a trail by connecting each adjacent points with the shortest line, and FIG. 28B shows determination of a trail along a course between two points.

BEST MODE FOR CARRYING OUT THE INVENTION

In what follows, with reference to the accompanying drawings, an embodiment of a game system and a program in accordance with the present invention will be explained in detail.

Figure 1:
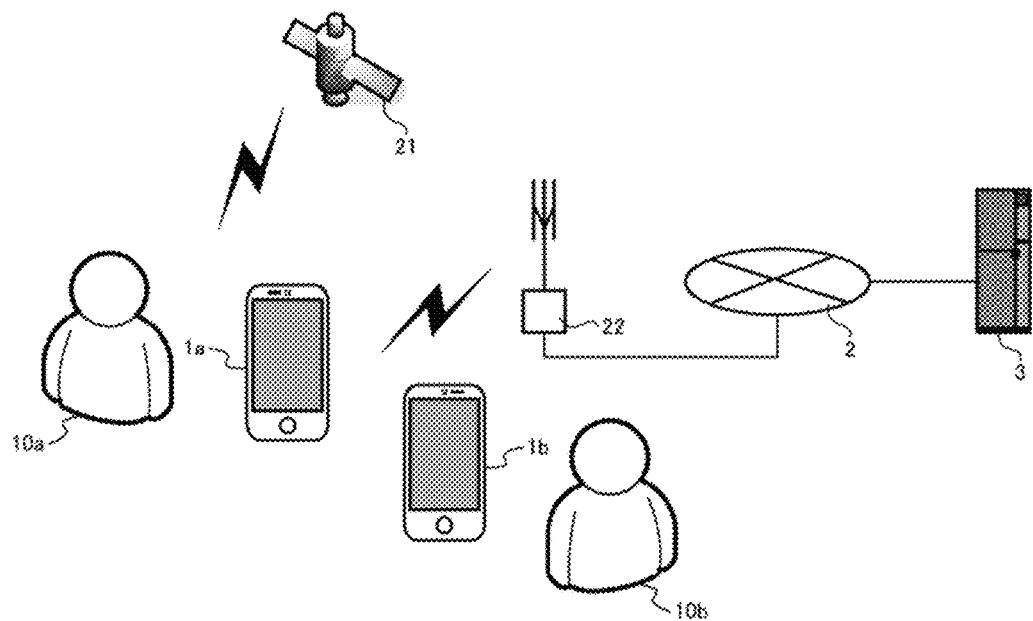
FIG. 1 is a schematic representation showing the overall configuration of a game system in accordance with an embodiment.

FIG. 1 is a schematic representation showing the overall configuration of a game system in accordance with the present embodiment. The game system of the present embodiment consists mainly of smartphones 1 (1a and 1b) which are mobile terminal devices used by a plurality of users 10a and 10b and a game server 3 which is installed on the Internet 2 as illustrated in FIG. 1. Meanwhile, in the case of the present embodiment, the smartphone 1 is explained as an example of a mobile terminal device.

The game server 3 is, in the case of the present embodiment, a server which performs a game progress process, and can be implemented with a single server device or a group of a plurality of servers to virtually build a plurality of function modules on a CPU so that processes are performed by cooperation of the function modules. In addition, this game server 3 can perform data transmission and reception through Internet by communication functionality, and can perform displaying a Web page through a browser software by Web server functionality.

The smartphone 1 is an information processing terminal device making use of wireless communication and serves as a cellular phone to wirelessly communicate with a relay point such as a wireless base station 22 to receive a communication service such as telephone conversation, data communication or the like while moving. The communication system for this cellular phone may be, for example, the 3G (3rd. Generation) system, the 4G system, the FDMA system, the TDMA system, the CDMA system, the WCDMA system or the PHS (Personal Handyphone System). Also, this smartphone 1 is implemented with various functions such as a digital camera function, an application software execution function, a positional information acquisition function utilizing GPS (Global Positioning System), and a mobile computer such as a tablet PC may be used instead.

The positional information acquisition function is a function for acquiring and recording positional information indicating the position of own device. For example, as illustrated in FIG. 1, this positional information acquisition function may detect the position of own device by the use of signals from a satellite 21, the intensity of radio waves from a wireless base station 22 for cellular phones, an access point of Wifi communication or the like.

Then, this smartphone 1 is provided with a liquid crystal display as a display unit for displaying information, and also provided with an operation device such as an operation button through which a user can perform input operation. This operation device also includes a touch panel which is arranged overlaid on the liquid crystal display as an input unit through which an operation signal is acquired in response to a touch operation pointing a coordinate position on the liquid crystal display and so forth. More specifically, this touch panel is an input device for inputting an operation signal through a pressure, a static electricity or the like in response to a touch operation with a user's finger, a pen or the like, and includes a liquid crystal display for displaying graphics and a touch sensor overlaid on the liquid crystal display to accept an operation signal in correspondence with an coordinate position in the graphics displayed on this liquid crystal display.

Internal Configuration of Each Device

Figure 3:
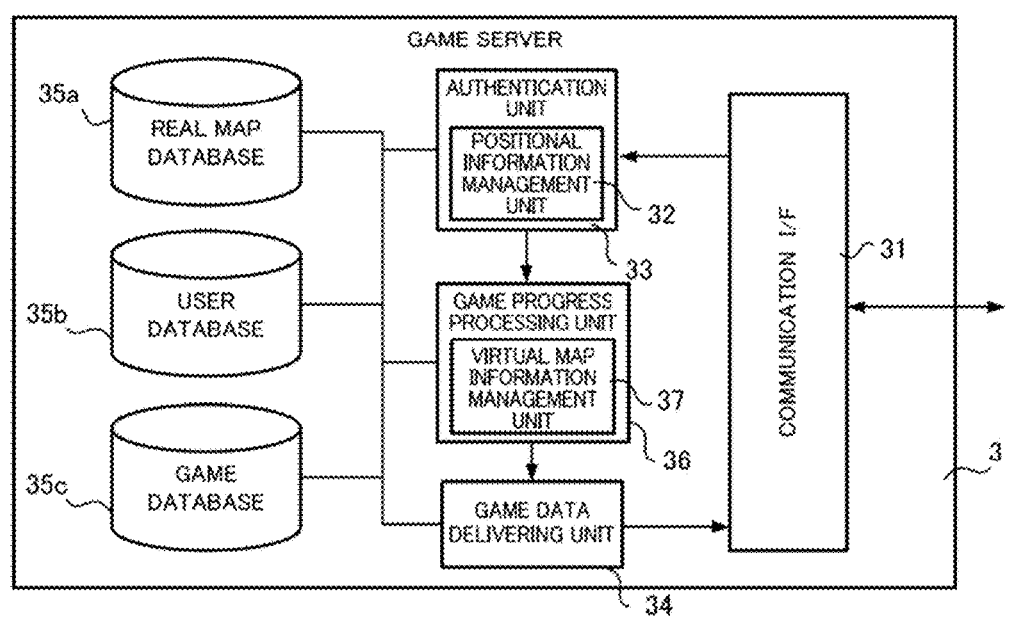
FIG. 3 is a block diagram for showing the internal configuration of the game server 3 in accordance with the embodiment.
Figure 4:
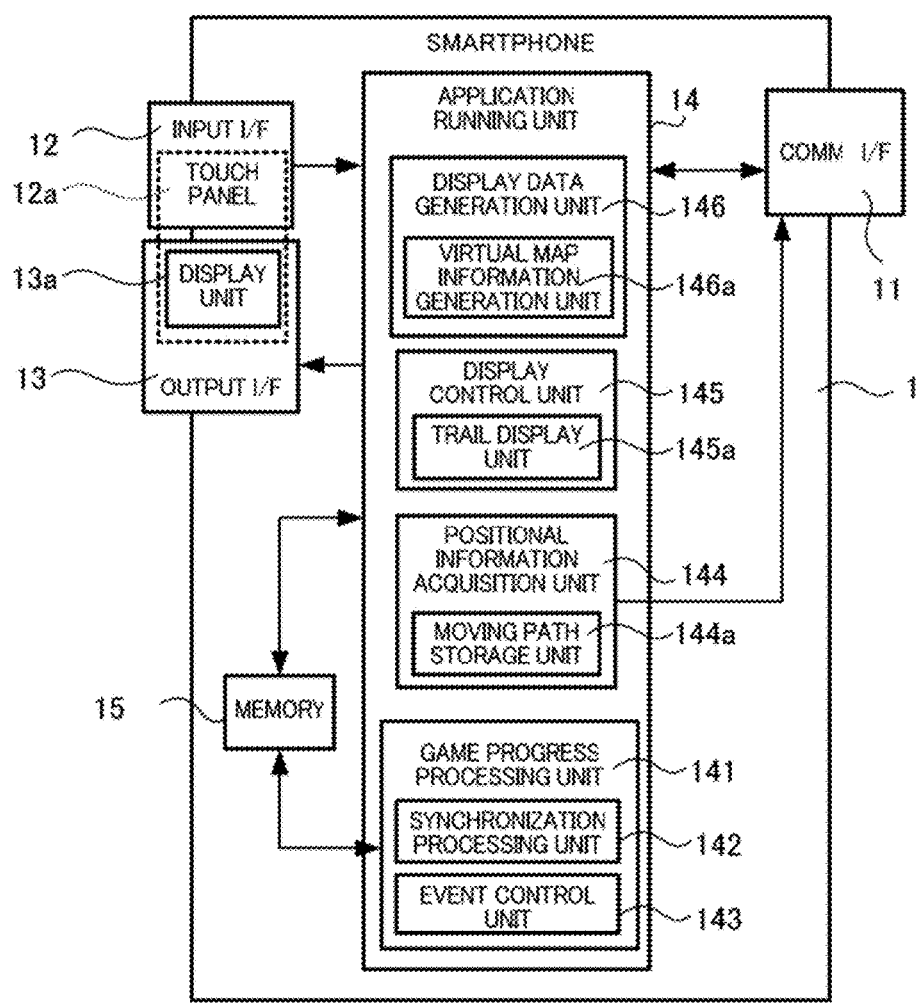
FIG. 4 is a block diagram for showing the internal configuration of a smartphone 1 in accordance with the embodiment.
Figure 5:
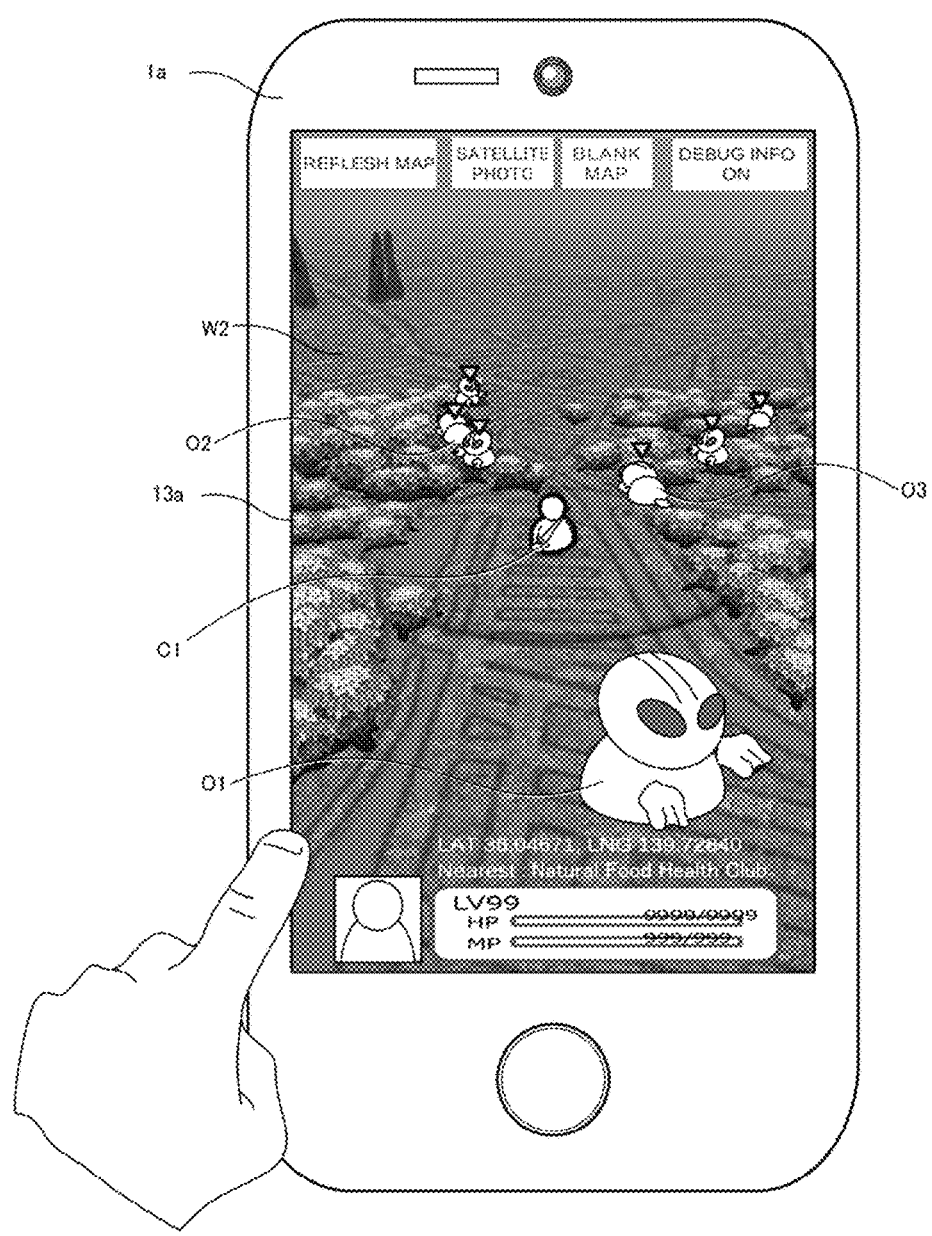
FIG. 5 is an explanatory view for showing the state of a virtual world displayed by the display control in accordance with the embodiment.
Figure 6:
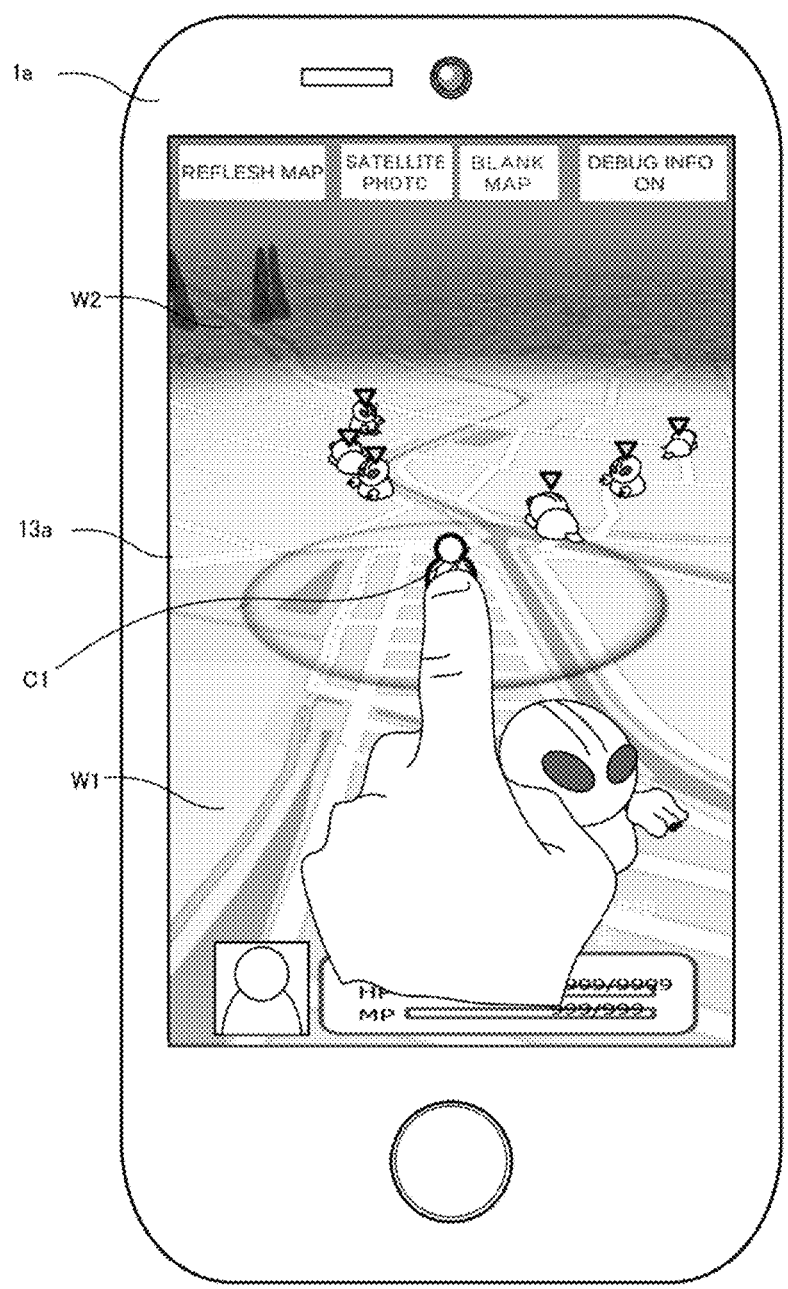
FIG. 6 is an explanatory view for showing the state of a virtual world, on which a real world is superimposed, displayed by the display control in accordance with the embodiment.

Next is an explanation of the internal configuration of each device constituting the game system as described above. FIG. 3 is a block diagram for showing the internal configuration of the game server 3 in accordance with the present embodiment. FIG. 4 is a block diagram for showing the internal configuration of the smartphone 1 in accordance with the present embodiment. Incidentally, the term "module" used in the following explanation stands for a function unit capable of performing a predetermined operation and implemented with hardware such as a device or apparatus, software capable of performing the functionality as required, or a combination thereof.

(1) Game Server

First, the internal configuration of the game server 3 will be explained. The game server 3 is a server device which is installed on the Internet 2 to perform data transmission and reception with each smartphone 1 through the Internet 2.

The game server 3 is provided with a communication interface 31 for performing data communication through the Internet 2, an authentication unit 33 for authenticating the authority of a user terminal or a user, a positional information management unit 32 for collecting and managing the positional information of each user terminal, a game progress processing unit 36 for performing a process for the overall game progress and a process for the game progress of each user, a virtual map information management unit 37 for generating virtual map information, a game data delivering unit 34 for delivering game data to each user, and a various database group.

The database group includes a real map database 35a as a real map storage unit for storing real map information containing geographical information in the real world, a user database 35b, and a game database 35c for accumulating virtual map information and information about the process for the overall game progress and the process for the game progress of each user. Each of these database may be an independent database, or a relational database may be constructed by setting relationships connecting data items to each other of a plurality of divided databases.

The real map database 35a is a storage device which stores real map information including geographical information in the real world, i.e., natural geographical elements such as mountains, valleys and rivers, artifacts such as buildings, roads and railroads, place names, addresses, traffic regulations and the like. Incidentally, this real map database 35a may be a database which is possessed and operated by a service provider who operates the game server 3, but may be a map database which is operated by another map service provider.

The information accumulated in the user database 35b includes identifiers (user ID, terminal ID) which identifies users or mobile terminal devices used by the users, authentication information associated with passwords and the like, personal information of the users associated with user IDs, and the model name of each terminal device. The user database 35b accumulates an authentication history (access history) of each user or each user terminal, information about the game progress of each user (current position such as degrees of latitude and longitude, status, score, usage history and the like of a game) with relationships to the game database 35c, and settlement information about the game progress.

The information accumulated in the game database 35c includes, as game data, the map information of a virtual world, the characteristics of characters and objects, information about event process, graphics information and the like, and also includes mapping information for associating the game data with geographic elements, buildings, roads, railroads and the like contained in a real map.

The authentication unit 33 is a module for establishing a communication session with each smartphone 1 through the communication interface 31 and performing an authentication process for each established communication session. This authentication process is performed to acquire authentication information from the smartphone 1 of the user who is an accessing person, refer to the user database 35b, identify the user and the like, and authenticate the authority thereof. The authentication result (user ID, authentication time, session ID and the like) obtained by this authentication unit 33 is transmitted to the game progress processing unit 36 and accumulated in the user database 35b as an authentication history.

The positional information management unit 32 is a module for acquiring positional information which is acquired by the user terminal device and transmitted to the game server 3. The positional information management unit 32 accumulates, as a usage history, the identifier (user ID, terminal ID or the like) of a user or a user terminal device identified by the authentication process of the authentication unit 33, and the positional information thereof in association with each other in the user database 35b.

The game progress processing unit 36 is a module for generating an event process to progress a game in a virtual world where characters corresponding to users and other objects move to execute a game program including certain rules, logics and algorithms and generate an event process such as a confrontation battle, a mini game, movie reproduction or the like in accordance with a positional relationship (approaching, contacting or the like) among characters and objects. Meanwhile, in the case of the present embodiment, the game progress processing unit 36 cooperates with a game progress processing unit 141 provided in the smartphone 1 in order that, while part of the game progress process is performed in the game server 3, part of the graphic process and the event process is performed in the game progress processing unit 141 of the smartphone 1. For example, the event process that may be invoked is predicted in the game server 3 side on the basis of the positions of the characters of other users and the positions of objects to generate the invocation condition of the event process in the game server 3, and the invocation condition is transmitted to the smartphone 1 so that the event process is actually invoked in the smartphone 1 which performs the graphic process required for the event process on the basis of the invocation condition which is received from the game server 3.

Figure 2:
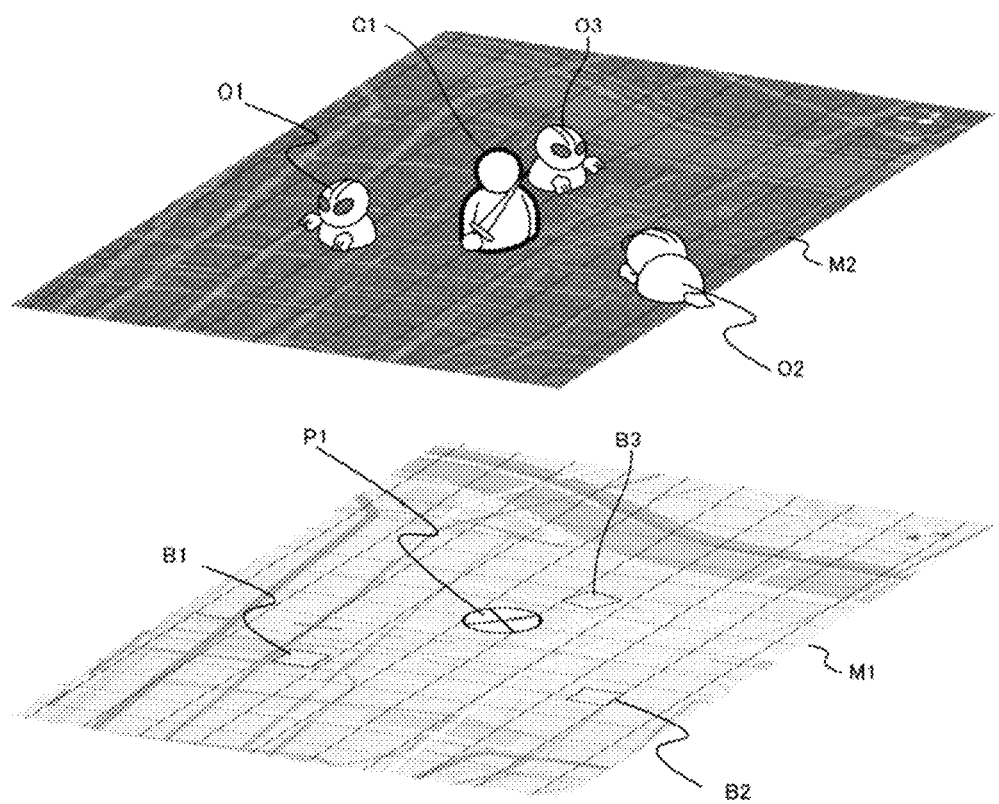
FIG. 2 is an explanatory view for showing the relationship between real map information M1 and virtual map information M2 in accordance with the embodiment.

The virtual map information management unit 37 is a module for managing and controlling the generation, accumulation and delivery of virtual map information M2 including the coordinate information of the character of another user, objects O1 to O3 and the like on the virtual geographical information corresponding to the geographical information of real map information M1 as illustrated in FIG. 2 in accordance with the game progress by the game progress processing unit 36. This virtual map information M2 may be generated in the game server 3 side, in the smartphone 1 side or by the cooperation of the game server 3 and the smartphone 1. The virtual map information management unit 37 manages the virtual map information M2 generated by or accumulated in the game server 3 side and the virtual map information M2 generated by or accumulated in the smartphone 1 side, compares these two pieces of the virtual map information M2, and if necessary, synchronizes these two pieces by delivering all or part of the virtual map information M2 to the smartphone 1 side.

Meanwhile, in the case where the virtual map information M2 is generated in the game server 3 side, the virtual map information management unit 37 acquires geographic elements, buildings, roads, railroads and the like contained in the real map information M1 which is accumulated in the real map database 35a, refers to mapping data accumulated in the game database 35c, and generate the virtual world map information on the basis of the virtual map information corresponding to the real map information M1, the characteristics (properties) of characters and objects, information about event processes, graphic information and the like. In this case, the objects O1 to O3 are arranged in the coordinate positions (coordinate areas) corresponding to the buildings B1 to B3 on the real map information M1.

The game data delivering unit 34 is a module for delivering map information and graphics in the virtual world through the communication interface 31 in order to synchronize the virtual map information M2 generated by the virtual map information management unit 37 in accordance with control by the virtual map information management unit 37 on the basis of the current position of the user.

(2) Smartphone 1

Next is an explanation of the internal configuration of the smartphone 1. As illustrated in FIG. 4, the smartphone 1 is provided with a communication interface 11, an input interface 12, an output interface 13, an application running unit 14 and a memory 15.

The communication interface 11 is a communication interface for performing data communication, and provided with the functions to perform contactless communication such as wireless communication and contact (wired) communication with a cable, adapter means or the like. The input interface 12 is a device such as a mouse, a keyboard, an operation button, a touch panel 12a and the like for inputting user operation. On the other hand, the output interface 13 is a device such as a display, a speaker and the like for outputting images and sounds. Particularly, this output interface 13 includes a display unit 13a such as a liquid crystal display on which the touch panel 12a is placed as the input interface.

The memory 15 is a storage device which stores an OS (Operating System), firm ware, programs for various applications and other data, and accumulates user IDs for identifying users and game application data downloaded from the game server 3 together with game data and the like processed by the application running unit 14. Particularly, in the case of the present embodiment, the memory 15 stores the virtual map information M2 and the real map information M1 acquired from the game server 3.

The application running unit 14 is a module for running a general OS and applications such as game applications and browser software, and usually implemented with a CPU and the like. This application running unit 14 virtually builds the game progress processing unit 141, a synchronization processing unit 142, an event control unit 143, a display data generation unit 146, a display control unit 145 and a positional information acquisition unit 144 by running the game program in accordance with the present invention.

The game progress processing unit 141 is a module for progressing a game by moving each character corresponding to each user, monsters and other objects in the virtual world to invoke various event processes such as a confrontation battle, a mini game, movie reproduction and the like in accordance with a positional relationship (approaching, contacting or the like) among characters and objects in synchronization with the game progress processing unit 36 in the game server 3 side through the synchronization processing unit 142.

In the case of the present embodiment, the game progress processing unit 141 cooperates with the game progress processing unit 141 of the game server 3 such that while part of the game progress process is performed in the game server 3, part of the graphic process and the event process is performed in the game progress processing unit 141 of the smartphone 1. For example, event invocation conditions are generated in the game server 3, and transmitted to the smartphone 1 in which the event process is actually invoked while the smartphone 1 performs the graphic process required for the event process.

The synchronization processing unit 142 is a module for synchronizing the game progress process in the smartphone 1 side with the game progress process in the game server 3 side. Specifically, the event process that may be invoked is predicted in the game server 3 side on the basis of the positions of the characters of other users and the positions of objects to generate the invocation condition of the event process in the game server 3, and the invocation condition is transmitted to the smartphone 1 and received by the synchronization processing unit 142 so that the event process is actually invoked by the game progress processing unit 141 of the smartphone 1 which performs the graphic process required for the event process on the basis of the invocation condition which is received from the game server 3. The results (winning/losing, score and the like of battle or mini game) of the event process performed by the game progress processing unit 141 in the smartphone 1 side are notified to the game progress processing unit 141 in the game server 3 side through the synchronization processing unit 142 and reflected in the subsequent game progress process.

On the other hand, the event control unit 143 is a module for monitoring the event process invoked by the game progress processing unit 141 and the moving speed of the current position of own device acquired by the positional information acquisition unit 144, and suspending a predetermined suspendable event process when the moving speed of the current position is no lower than a predetermined value and when the event process invoked by the game progress processing unit 141 is the suspendable event process. The game progress processing unit 141 can progress the game by invoking another event process while suspending the event process to be suspended. The synchronization processing unit 142 notifies the game progress processing unit 141 in the game server 3 side of the event process suspended by the event control unit 143 to report to the game server 3 that the game is progressed while suspending the event process which satisfies the invocation condition of the event process.

The positional information acquisition unit 144 is a module for selecting and acquiring coordinate positions in the real world to acquire the current position of the user and the current positions of other users by a global positioning system (GPS), a base station positioning system using triangulation on the basis of the intensities of radio waves transmitted from base stations and information about the base stations, a wifi positioning system using a database of wifi SSID (Service SetID), the degrees of latitude and longitude and the radio wave condition in combination, or the like.

Also, this positional information acquisition unit 144 can acquire positional information and measure a moving speed by selecting an arbitrary coordinate position on the basis of a user operation or event invocation according to the game progress. Furthermore, the positional information acquisition unit 144 has a function to acquire the coordinate position of an arbitrary object, and can acquire the current coordinate position, the coordinate position in the virtual map, and the displacement history thereof by searching the databases 35a to 35c.

Particularly, the coordinate position of this arbitrary object can be acquired by retrieving, from the databases 35a to 35c, the position in which an object to be a proxy of the user is arbitrarily set on the real map information or the virtual map information as a proxy object. The position of this proxy object on the map information is automatically moved by the game progress processing unit 36 or 141 in accordance with the progress of the game or in synchronization with the current position of a specified user.

Furthermore, when measuring a moving speed, the positional information acquisition unit 144 can detect an instantaneous movement with reference to the detection signal from an acceleration sensor which is provided in the smartphone 1. When an acceleration no smaller than a predetermined value is detected, it is determined that the user is moving. On the other hand, with respect to moving speed measurement, for example, when the user is moving at a high speed on a vehicle, the change in a GPS value is used to determine that the user is moving. With respect to this high speed movement, in the case where no GPS signal can be received under the ground such as a subway, or inside a train station, the movement of the user is determined, when it is determined that the positional information greatly changes as compared with usual movement during walking, by monitoring update of positional information on the basis of the change in the radio wave reception state, or the handover between base stations such as 3G/4G, wifi or the like. Incidentally, with respect to the movement determination based on the handover of base stations or the like, the positional information changes discontinuously so that the moving distance and moving speed of a user are predicted with certain allowances in accordance with the distance between base stations and the change amount of radio waves, e.g., such that it is determined that the user is moving for a certain period (e.g., 5 minutes) after movement is detected.

Also, in the case of the present embodiment, the positional information acquisition unit 144 is provided with a moving path recording unit 144a which is a module for calculating and recording moving paths and moving speeds on the basis of the displacement history of each user or object obtained with reference to the current position of the user, the current positions of other users, the coordinate positions of arbitrary objects and the like as acquired by the positional information acquisition unit 144. This moving path recording unit 144a can calculate the moving path by, for example, connecting each adjacent points of sampled positions with the shortest line in time-series order to determine the moving path or referring to the geographical information to determine the path along the course between two points.

The display data generation unit 146 is a module for generating display data to be displayed on the display unit 13a. The display data is data which is generated by combining graphics data with image data, character data, video data, sound or other type data. Particularly, the display data generation unit 146 according to the present embodiment functions as a real display data generation unit which generates real display data indicating the current position of the user on the real map information M1 on the basis of the current position of the user acquired by the positional information acquisition unit 144, and a virtual display data generation unit which generates virtual display data for showing a character on the virtual map information M2 corresponding to the current position of the user on the basis of the current position acquired by the positional information acquisition unit 144. The display control unit 145 controls the process of displaying the display data generated by this display data generation unit 146.

This display data generation unit 146 is provided with a virtual map information generation unit 146a which is a module for generating the virtual map information M2 including the coordinate information of the characters of other users and the objects O1 to O3 on the virtual geographical information corresponding to the geographical information on the real map information M1 as illustrated in FIG. 2 in accordance with the game progress by the game progress processing unit 141. The virtual map information generation unit 146a acquires geographic elements, buildings, roads, railroads and the like contained in the real map information M1 accumulated in the real map database 35a in the memory 15 or on a network, and generates virtual world map information on the basis of the virtual world map information corresponding to corresponding to the real map information M1, the characteristics of characters and objects, information about event process, graphics information and the like by referring to mapping data accumulated in the memory 15 and the game database 35c. In the case of the example shown in FIG. 2, the objects O1 to O3 are arranged in the coordinate positions (coordinate areas) corresponding to the buildings B1 to B3 on the real map information M1.

Incidentally, while the virtual map information M2 is generated by the virtual map information generation unit 146a of the smartphone 1 in the case of the present embodiment, the virtual map information M2 corresponding to the geographical information of the real map information M1 can be generated by the virtual map information management unit 37 of the game server 3 in advance or on a real time base, followed by delivering the virtual map information M2 to each smartphone 1 by the game data delivering unit 34 to achieve synchronization.

The display control unit 145 is a module for controlling the display unit 13a to display both or selected one of the virtual display data and the real display data generated by the display data generation unit 146, or display part of either one overlapping the other. The display unit 13a is controlled by this display control unit 145 to display the real display data and the virtual display data.

Also, the display control unit 145 according to the present embodiment is provided with the trail display unit 145a. This trail display unit 145a is a module for displaying, as trails, the moving path of the user recorded by the moving path recording unit 144a, the moving paths of other users and the moving paths of arbitrary objects on the real map information M1 or the virtual map information M2. This trail display unit 145a displays a trail by for example coloring, with a certain width, the moving path determined by connecting each adjacent points of sampled positions with the shortest line in time-series order or referring to the geographical information to determine the path along the course between two points and coloring the determined path with a certain width. Furthermore, this trail display unit 145a displays a trail by coloring, as part of the trail, an area or an object in a neighbourhood of the moving path of each user or object on the real map information M1 or the virtual map information M2.

This area may be displayed by coloring a block as a unit such as an administrative division, a town division, a prefecture, a municipality or the like defined on the basis of the actual geographical information or the virtual geographical information. This block unit coloring may be performed by coloring a block abutting onto the moving path determined by connecting each adjacent points with the shortest line in time-series order or a block abutting onto the moving path determined along the course between two points with reference to the geographical information.

Display Control by Game System and Game Program

Next is an explanation of the display control by a game image processing system and a game image processing program in accordance with the present invention. FIGS. 5 to 9C are explanatory views for showing the display control in accordance with the present embodiment.

Figure 7:
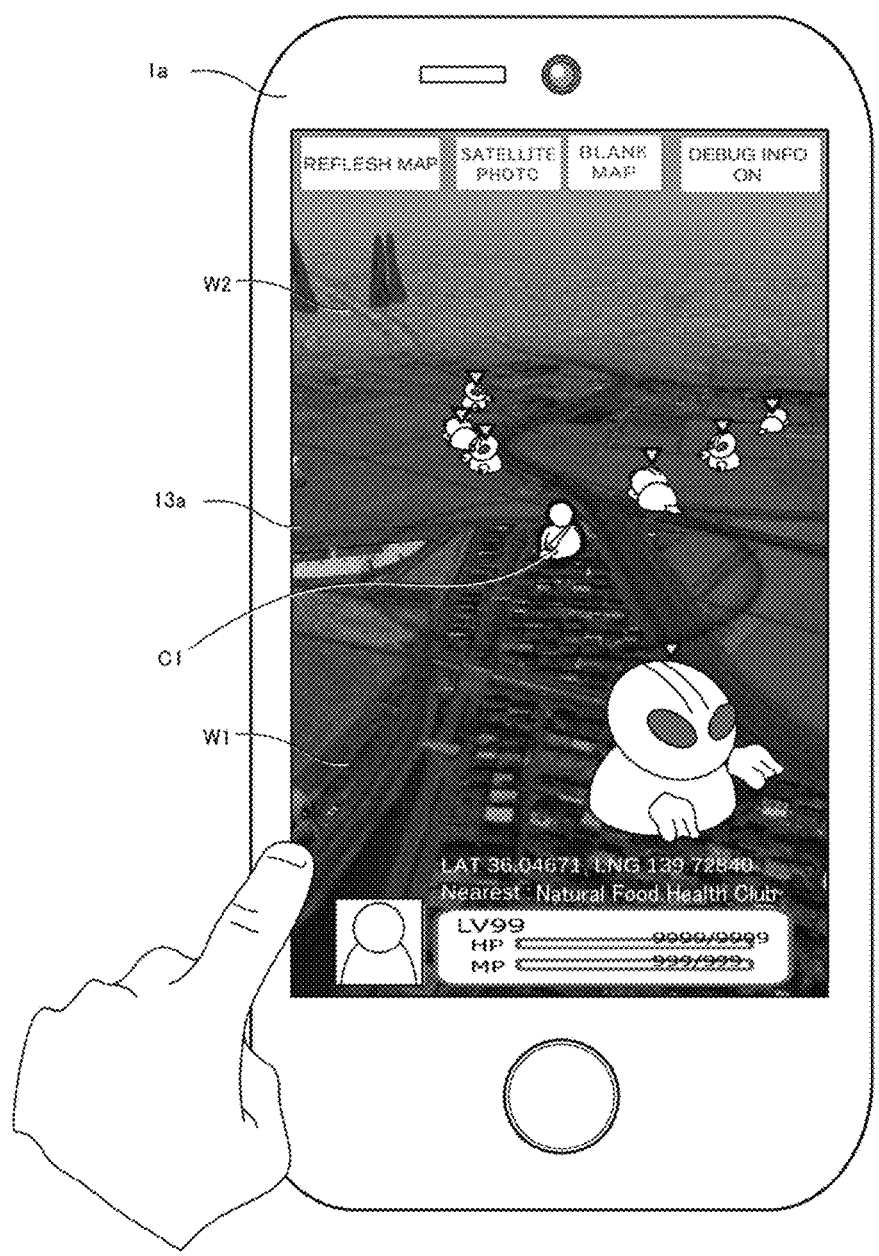
FIG. 7 is an explanatory view for showing the state of a virtual world, on which a satellite photograph of a real world is superimposed, displayed by the display control in accordance with the embodiment.

The trail display unit 145 as described above changes the display of real display data W1 and virtual display data W2 in accordance with the coordinate position designated by an operation signal acquired through the touch panel 12a or movement of this coordinate position. Specifically, in the case of the game system according to the present embodiment, a virtual world is built by the virtual map information M2 constructed on the basis of the real map information M1 with virtual display data W2 displayed to represent the virtual world in 3D on the display unit 13a of the smartphone 1 as illustrated in FIG. 7. This virtual display data W2 includes a character C1 representing the user himself displayed in the center of the screen, and the objects O1 to O3 such as monsters displayed as if they are wondering around the user. As illustrated in FIG. 2, these objects O1 to O3 are arranged in the coordinate positions (coordinate areas) corresponding to the buildings B1 to B3 on the real map information M1 as if they are wondering.

Figure 8A:
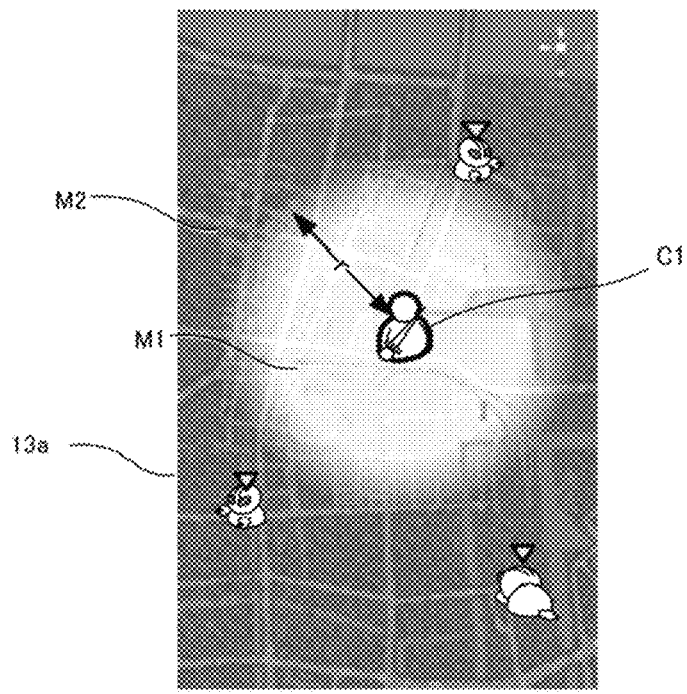
FIG. 8A and FIG. 8B are explanatory views for showing a modification example of the display control in accordance with the embodiment.
Figure 8B:
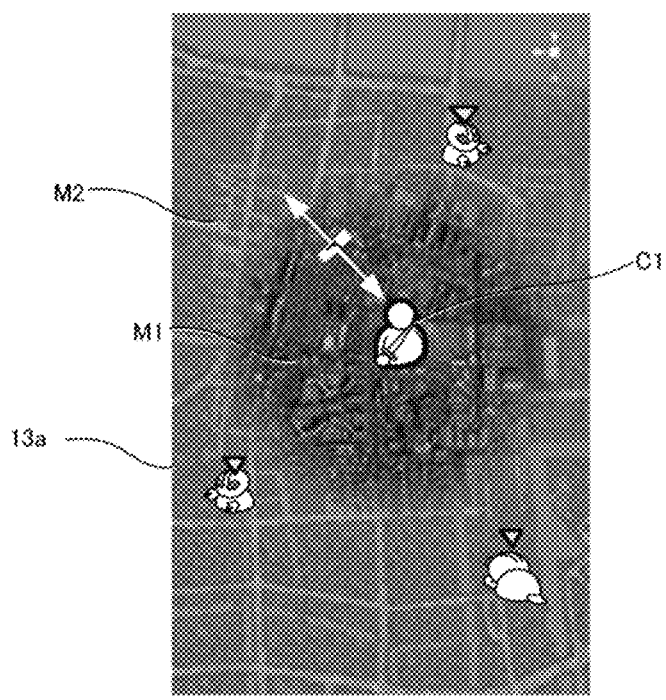

The touch panel 12a can be used to perform magnification/reduction or moving a camera viewpoint by tapping or swiping with a finger. In addition to this, it is possible to display both or selected one of the virtual display data W1 and the real display data W2, or display part of either one overlapping the other by performing a predetermined gesture operation on the touch panel 12a. Specifically, by pressing the character C1 for a long time (about two seconds) on the virtual display data W2 displayed as illustrated in FIG. 7, the real display data W1 is displayed in a partially superimposed manner as illustrated in FIG. 8A and FIG. 8B within a circular area around the character C1 representing the current position of the user himself. This partial real display data W1 which is displayed in a superimposed manner can be removed by releasing the finger from the screen to resume the original display only with the virtual display data W2. Also, this real display data W1 can be composed of a satellite photograph as illustrated in FIG. 9A through FIG. 9C.

Furthermore, the display control unit 145 of the present embodiment is provided with a function to change the display of the real display data W1 and the virtual display data W2 or the operation of displaying the same in accordance with the progress of the game by the game progress processing unit 141. For example, as illustrated in FIG. 8A and FIG. 8B, the display control unit 145 changes the radius r of the circular area in which the real display data W1 is partially superimposed around the character C1 in accordance with the progress of the game. For example, in the case where the user is a person who is unfamiliar with operations, the radius r is increased, and then controlled to be decreased as the game is progressed and the difficulty of the game is raised. Also, while the radius r may be increased when it is detected that the smartphone 1 is moving, the radius r may be decreased when it is detected that the smartphone 1 is stopped.

Furthermore, as an example of an operation of switching the display between the virtual display data W2 and the real display data W1, the touch contact point can be moved from one edge of the screen toward the other edge as illustrated in FIG. 9 by so-called swipe operation to switch between the virtual display data W2 and the real display data W1 in order that the screen transits from FIG. 9A to FIG. 9C to introduce an animation effect as if a page is turned up. In this case, the swipe operation in the reverse direction may be used to return to the previous virtual display data W2 from FIG. 9C to FIG. 9A.

In accordance with the present embodiment, the entertainment property of the game can be improved by introducing the simple operation of switching the map display between the real world and the virtual world to improve the operability and partially superimposing the real world map on the virtual world map.

Generation Process of Virtual Display Data

The process of generating virtual map information by the display data generation unit 146 as described above will be explained. As has been discussed above, the display data generation unit 146 generates virtual map information corresponding to geographical information on the real map information in accordance with the game progressed by the game progress processing unit 36 or 141, and arranges objects on the map on the basis of the coordinate information of the virtual map information. In the case of the present embodiment, geographical information is generated as a base of virtual map information by extracting, from real map information, the contour lines of roads, rivers, divisions, other buildings and the like in the map, and a bird's eye view is displayed to reproduce perspectiveness by combining geographical information in this real map or virtual real map in different scales. This virtual map information is three-dimensionally displayed by arranging objects such as buildings and structures in the virtual real world.

Figure 23:
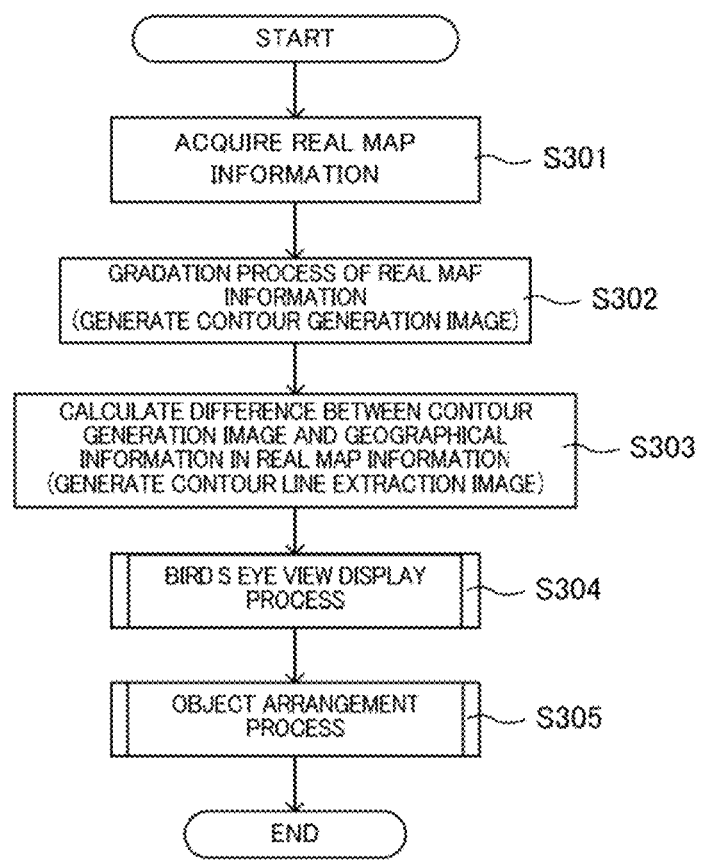
FIG. 23 is a flow chart for showing the procedure of the contour line extraction process in accordance with the embodiment.
Figure 24:
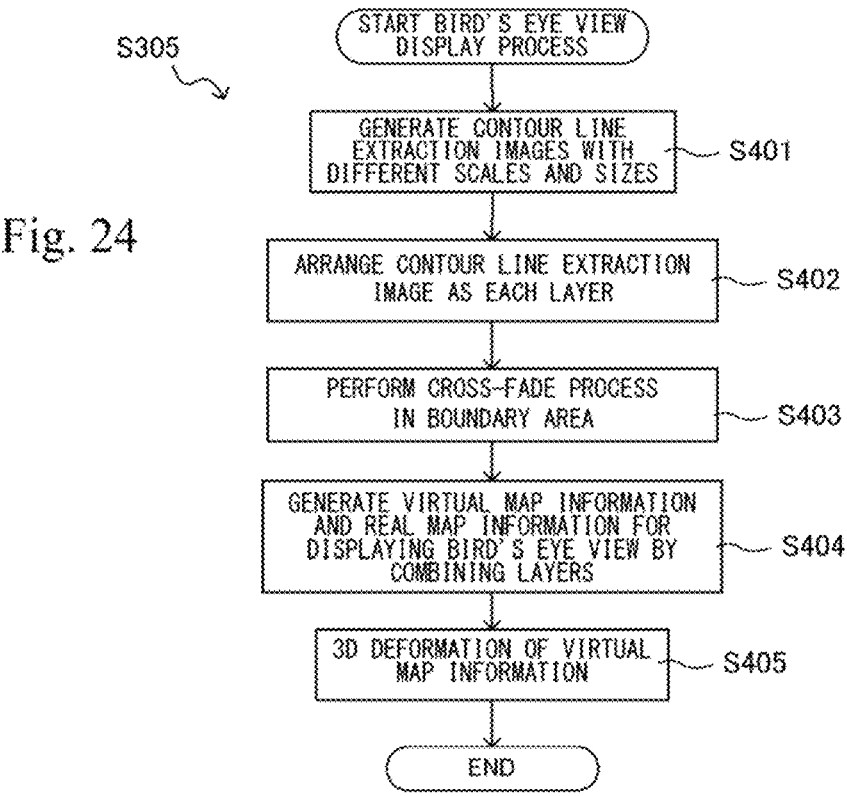
FIG. 24 is a flow chart for showing the procedure of the bird's eye view display process in accordance with the embodiment.
Figure 25:
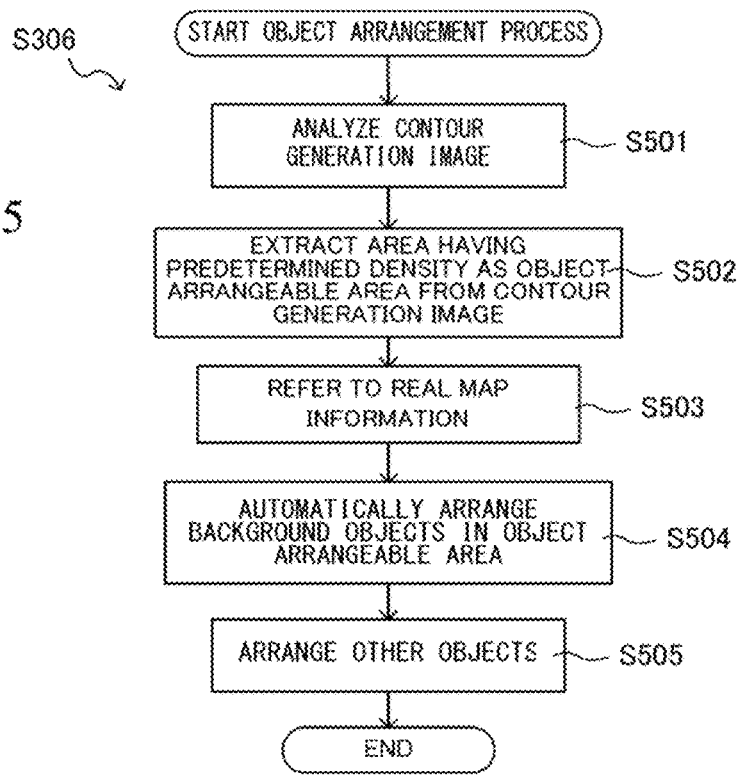
FIG. 25 is a flow chart for showing the procedure of the object arrangement process in accordance with the embodiment.

In what follows, each process will be explained. FIG. 23 is a flow chart for showing the procedure of a contour line extraction process in accordance with the present embodiment. FIG. 24 is a flow chart for showing the procedure of a bird's eye view display process in accordance with the present embodiment. FIG. 25 is a flow chart for showing the procedure of an object arrangement process in accordance with the present embodiment.

(1) Contour Line Extraction Process

Figure 12:
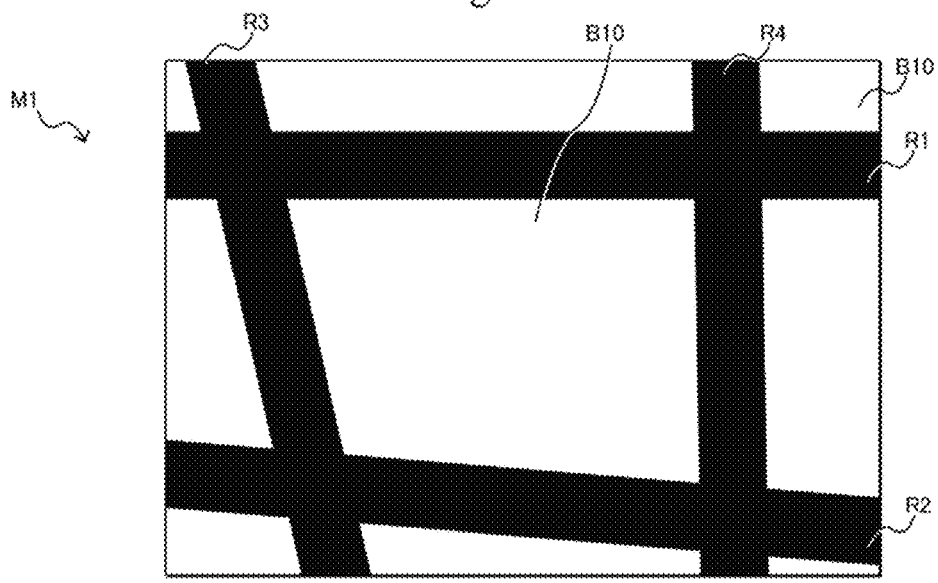
FIG. 12 is an explanatory view for showing real map information which is handled by the contour line extraction process in accordance with the embodiment.

First, the procedure of the process of extracting contour lines to be included in virtual map information from real map information with reference to FIG. 12 through FIG. 16 and FIG. 23. Meanwhile, in the following explanation, FIG. 12 is an explanatory view for showing real map information which is handled by the contour line extraction process of the present embodiment. In the case of the example shown in FIG. 12, the real map information M1 contains an area B10 surrounded by roads R1 to R4.

As shown in FIG. 23, first, the display data generation unit 146 acquires the real map information M1 (S301). At this time, the real map information M1 as geographical information in the real world is given either in the form of a map image in a bit map format or in the form of numerical information such as vector or polygon graphics consisting of coordinates, attribute information and the like. In the case where the real map information M1 is given as an image, this image is acquired as it is. Conversely, in the case where the real map information M1 is given as numerical information such as vector or polygon graphics, the numerical information is converted to a map image, such as a bit map, which is then acquired as the real map information M1.

Figure 13A:
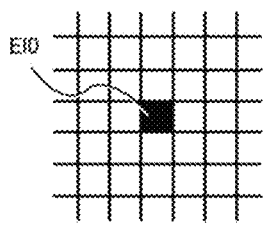
FIG. 13A, FIG. 13B and FIG. 13C are explanatory views for showing a blurring process in a gradation process in accordance with the embodiment.
Figure 13B:
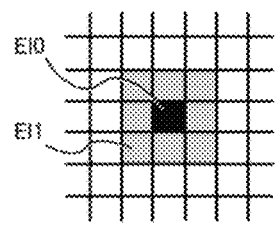
Figure 13C:
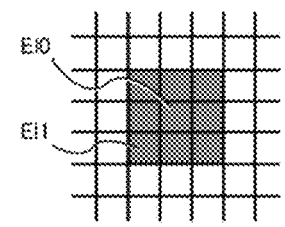
Figure 14:
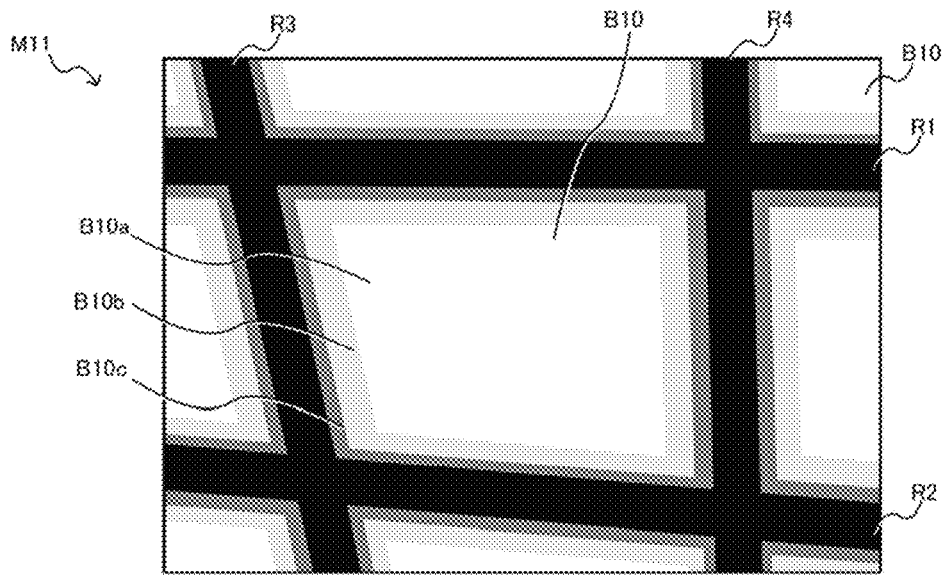
FIG. 14 is an explanatory view for showing a contour generation image in accordance with the embodiment.

Next, a contour generation image M11 in which boundary lines are blurred in the real map information is generated by performing a gradation process to fade color boundaries (FIG. 14) in the map image of the real map information M1 (S302). This contour generation image M11 includes a gradation formed with areas B10a to B10c whose color is gradually thinned from black in the roads R1 to R4 to white in the area B10 by blurring the boundaries between the area B10 and the roads R1 to R4. This gradation process is performed, for example, by calculating the weighted average of an arbitrary designated picture element El0 in the real map information and eight picture elements El1 surrounding this picture element El0, and coloring these picture elements with the weighted average color to blur the designated picture element El0 and thereabout as illustrated in FIG. 13A through FIG. 13C. By this configuration, near the boundary of different colors, color in a neighbourhood of the designated picture element is blurred, and a gradation of gradually thinning (thickening) color is formed by successively repeating this process for all the picture elements.

Figure 15:
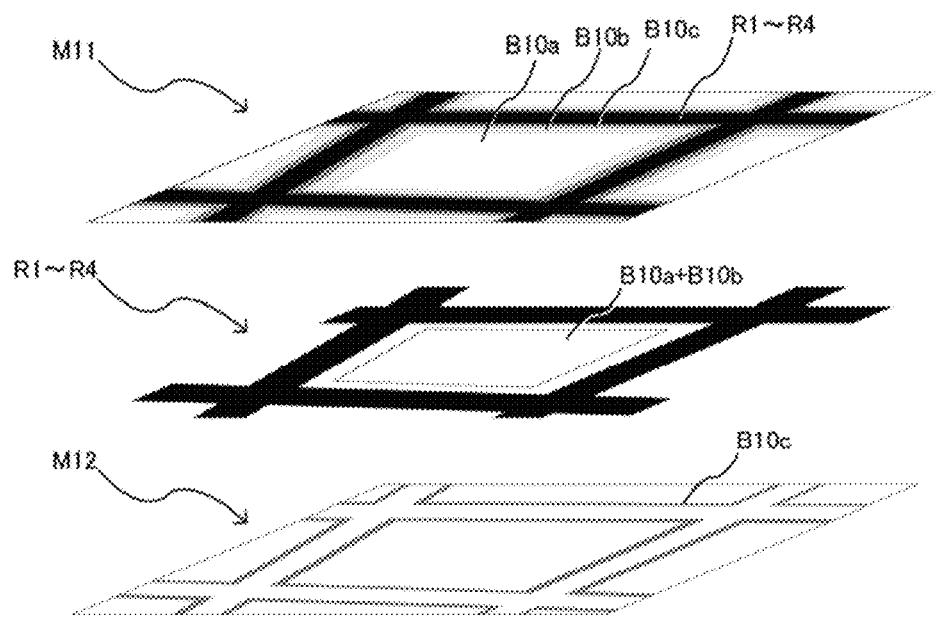
FIG. 15 is an explanatory view for showing the outline of a contour line extraction process in accordance with the embodiment.

Next, as illustrated in FIG. 15, a contour line extraction image M12 is generated from the difference between the contour generation image M11 and the geographical information in the real map information (S303). Specifically, the color boundaries of the contour generation image M11 are blurred and fringed by paler colors than the original geographical information (the area B10 and the roads R1 to R4 in the illustrated example). Because of this, the contour line extraction image M12 is generated by subtracting predetermined color picture elements from the original geographical information in the real map information to extract only the picture elements which are blurred to be fringes. In this case, the contour line extraction image M12 consisting of the contours with which the roads R1 to R4 are fringed is generated by subtracting, of the geographical information in the real map information, the color picture elements of the roads R1 to R4 and the picture elements of the areas B10a+B10b which are somewhat close in color to the original area B10, from the contour generation image M11.

Figure 16:
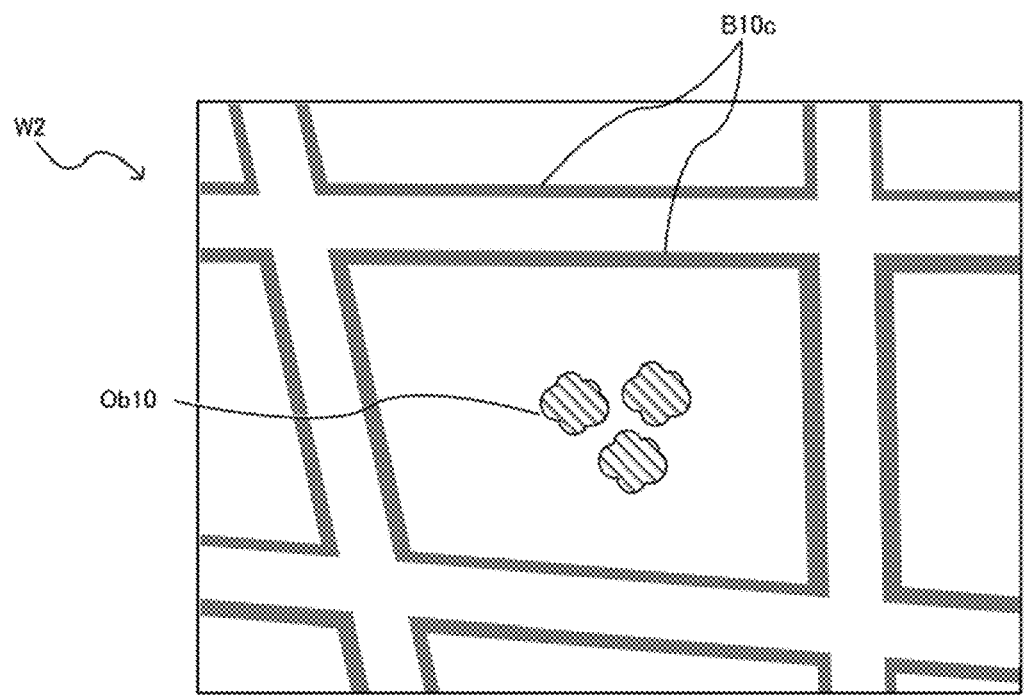
FIG. 16 is an explanatory view for showing virtual map information generated by the contour line extraction process in accordance with the embodiment.
Figure 18:
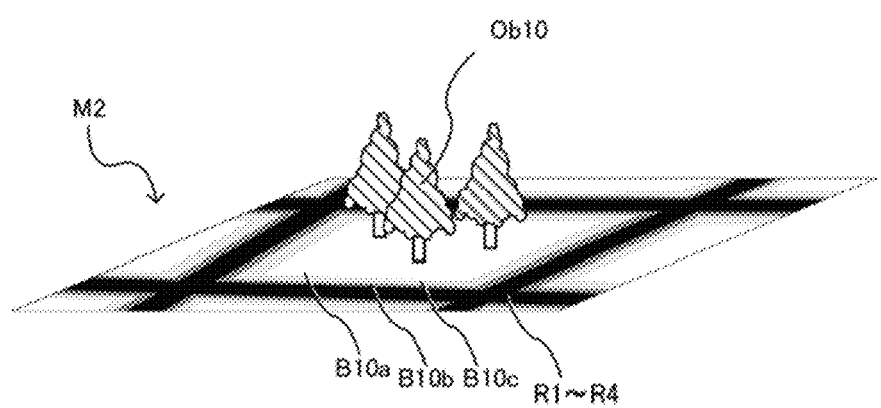
FIG. 18 is an explanatory view for showing virtual map information, which is three-dimensionally displayed, generated by the object arrangement process in accordance with the embodiment.
Figure 19:
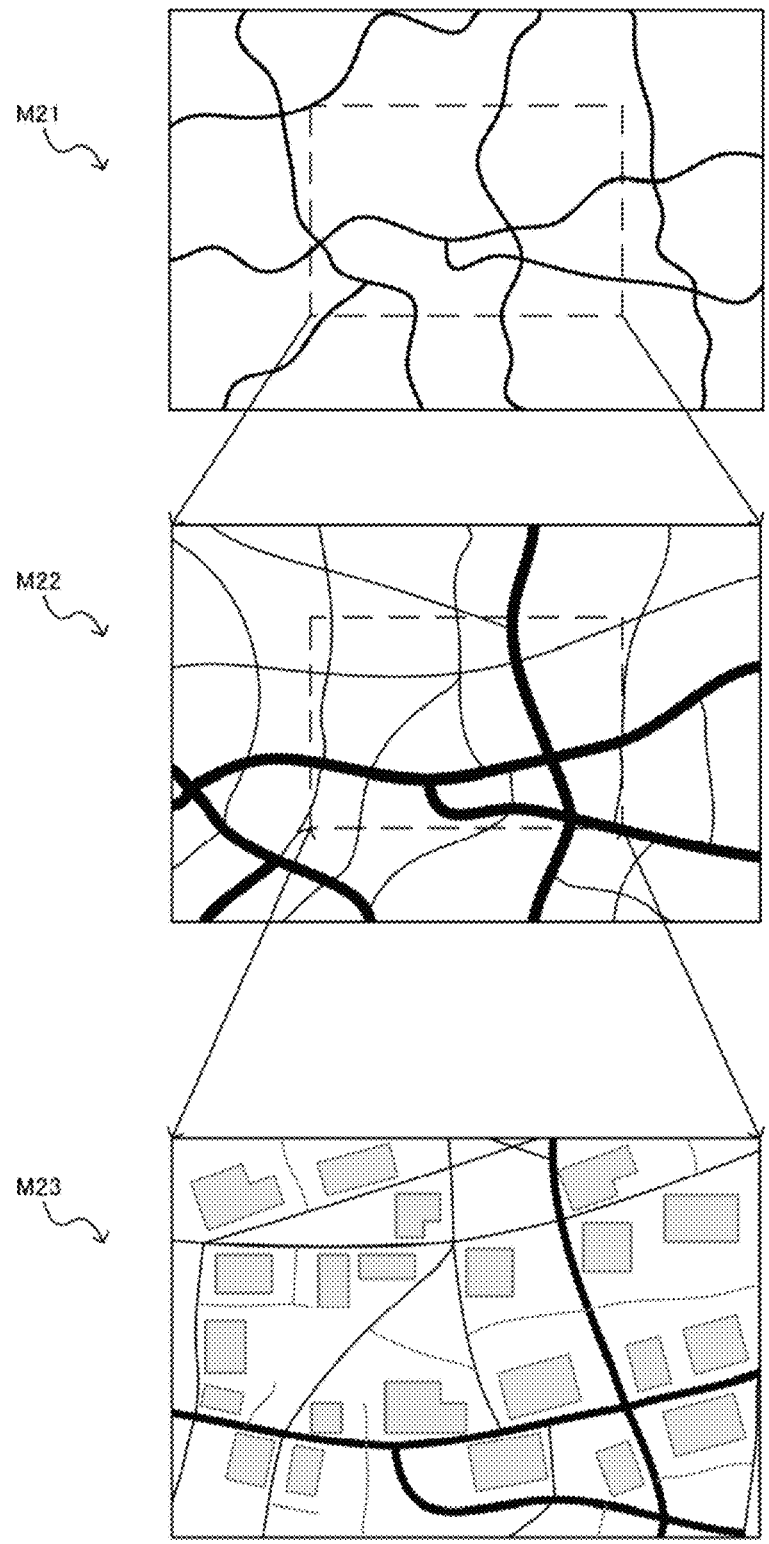
FIG. 19 is an explanatory view for showing the relationship between maps having different scales and combined by a bird's eye view display process in accordance with the embodiment.

Then, the virtual display data W2 as illustrated in FIG. 16 is generated on the basis of the contour line extraction image M12 by generating the virtual display data W2 (S304) for bird's eye view display as illustrated in FIG. 18 and arranging objects Ob10 such as trees and buildings (S305). The arrangement of the objects Ob10 based on the contour line extraction image M12 is performed by making use of the gradation drawn in the contour generation image M11.

(2) Bird's Eye View Display Process

Figure 20:
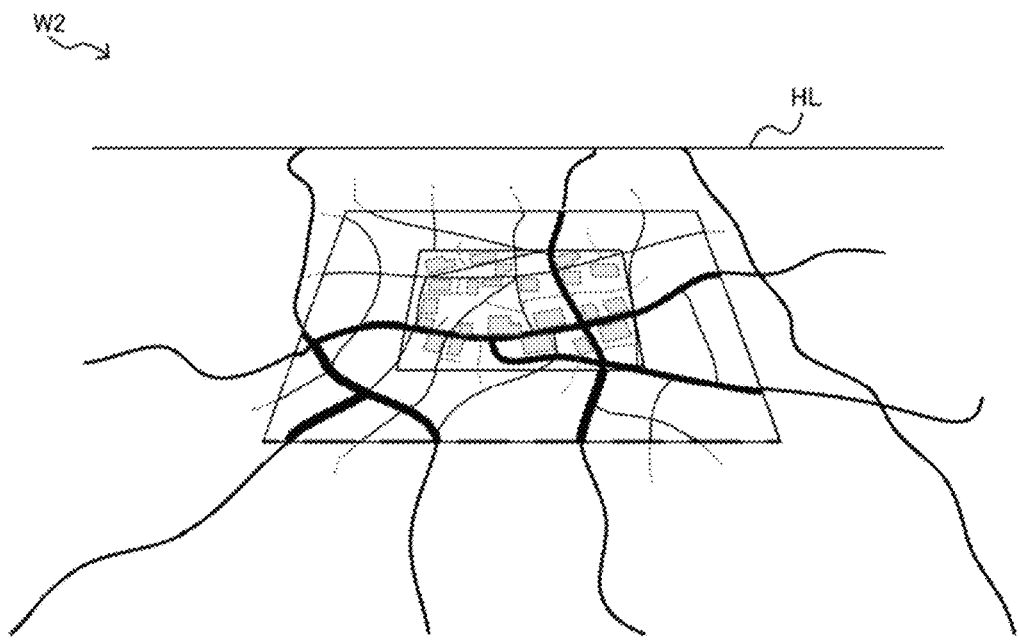
FIG. 20 is an explanatory view for showing virtual map information generated by the bird's eye view display process in accordance with the embodiment.

In the case of the virtual display data W2 for displaying the virtual map information M2 as described above, the direction and depression angle of the map can be three-dimensionally changed as illustrated in the bird's eye view shown in FIG. 20. This bird's eye view is displayed in order that the view can be displayed larger and clearer in the vicinity of the eye position, and becomes blurred in a smaller size as leaving the eye position. Depending upon the depression angle of the bird's eye view display, a horizon HL may be displayed as the display limit of the map.

In the case of the bird's eye view display process according to the present embodiment, the bird's eye view is displayed in order that the scale of the map is decreased to display details of geographical information near the current position of the user in the center of the map, and that the scale of the map is increased to omit the display of the geographical information to lessen the processing load by decreasing the resolution without compromising the functionality of the map to reproduce perspectiveness with reality. FIG. 24 shows the procedure of this contour line extraction process.

Figure 21:
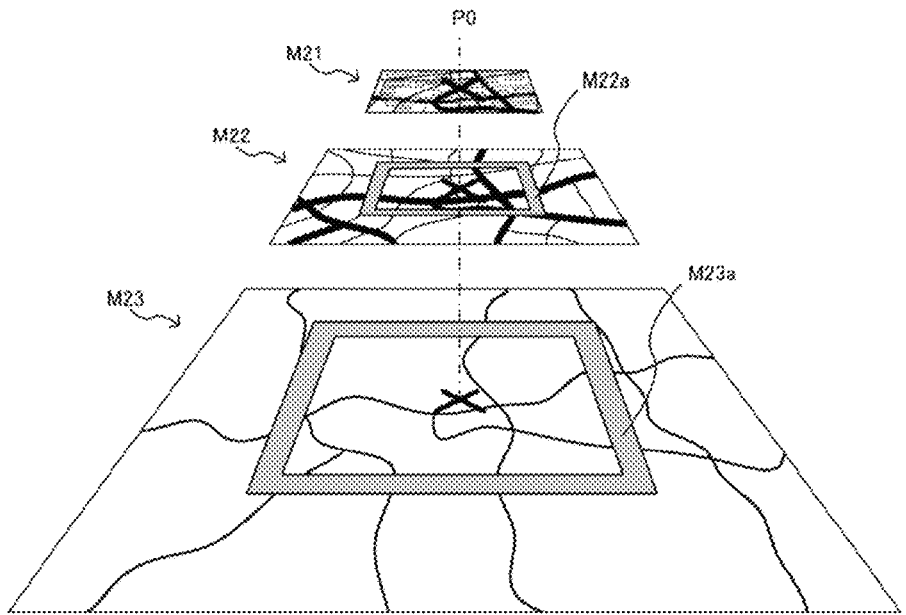
FIG. 21 is an explanatory view for showing the procedure of the bird's eye view display process to combine maps having different scales in accordance with the embodiment.
Figure 22:
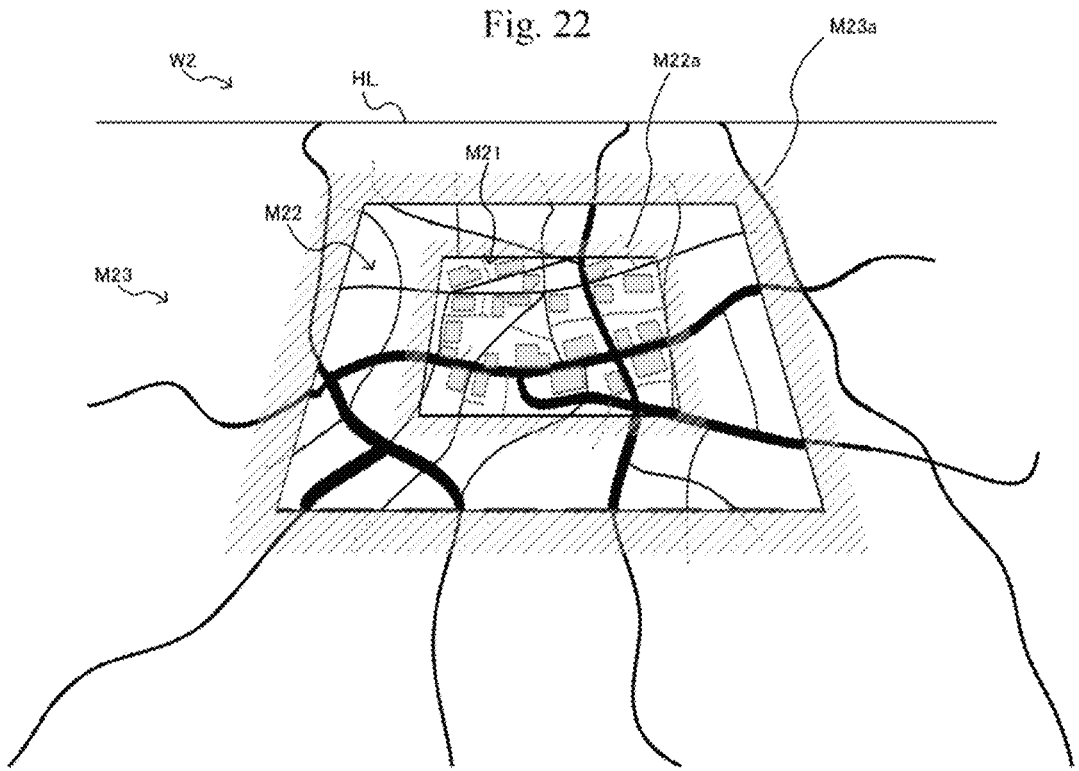
FIG. 22 is an explanatory view for showing virtual map information in a bird's eye view in accordance with the embodiment.

First, as shown in FIG. 24, contour line extraction images are generated with different scales and sizes (S401). These contour line extraction images having different scales and sizes can be generated by performing the above contour line extraction process with the real map information having different scales. Then, as illustrated in FIG. 21, the display data generation unit 146 arranges a detailed map M21 having a greater scale (the denominator of the scale is small) as an upper layer with a predetermined center coordinate position P0 as a center (S402). In this case, low resolution maps M22 and M23 are successively arranged as low layers to generate the virtual map information M2. As a result, in the virtual display data W2 displaying the virtual map information M2, as illustrated in FIG. 22, a plurality of low resolution maps M22 and M23 having stepwise reduced scales and increased areas are coaxially arranged around the detailed map M21 having a greater scale.

Next, the display data generation unit 146 generates virtual map information for displaying a bird's eye view by combining these layer (S404) while performing a cross-fade process (S403) at a boundary area M22a between the detailed map M21 and the low resolution map M22 and a boundary area M23a between the low resolution map M22 and the low resolution map M23 to gradually transition one image to the other image. This cross-fade process is performed by gradually increasing the transparent degree of roads, rivers, border lines and the like toward the periphery of the high resolution map in the upper layer in order to gradually thin these profiles, and gradually thickening the low resolution map in the lower layer so that detailed lines of roads and the like displayed in the upper map are gradually disappearing near the boundary areas in accordance with their importance, so that the high resolution map naturally resolution transitions to the low resolution map as the distance from the center coordinate position P0 increases.

Incidentally, the process in steps S401 to S404 as discussed above is performed also with the real map information to generate real map information for displaying a bird's eye view. Then, the bird's eye view display process is finished after performing 3D deformation of the virtual or real map information for displaying a bird's eye view, and performing an image process such as blurring distant places (S405). At this time, each object to be displayed on the map is displayed after performing three-dimensional deformation in accordance with the camera position of the bird's eye view display and the angle and direction of the sight lines.

(3) Object Arrangement Process

As has been discussed above, the display data generation unit 146 generates the virtual display data W2 by arranging a variety of objects on coordinates of the virtual map information M2. Basically, virtual background objects Ob10 are arranged in correspondence with geographical features such as mountains, hills, rivers, roads and the like on the real map information, and the positions of buildings as main landmark. Furthermore, in the case of the present embodiment, background objects Ob10 are automatically arranged on the virtual map information also in the case where these objects Ob10, which are not included in the real map information, are needed for performance of the game, for example, to represent the environment of the map with trees in the forest, rocks in the wilderness, plants in the grassy plain and the like. FIG. 25 shows the procedure of this automatic object arrangement process.

Figure 17:
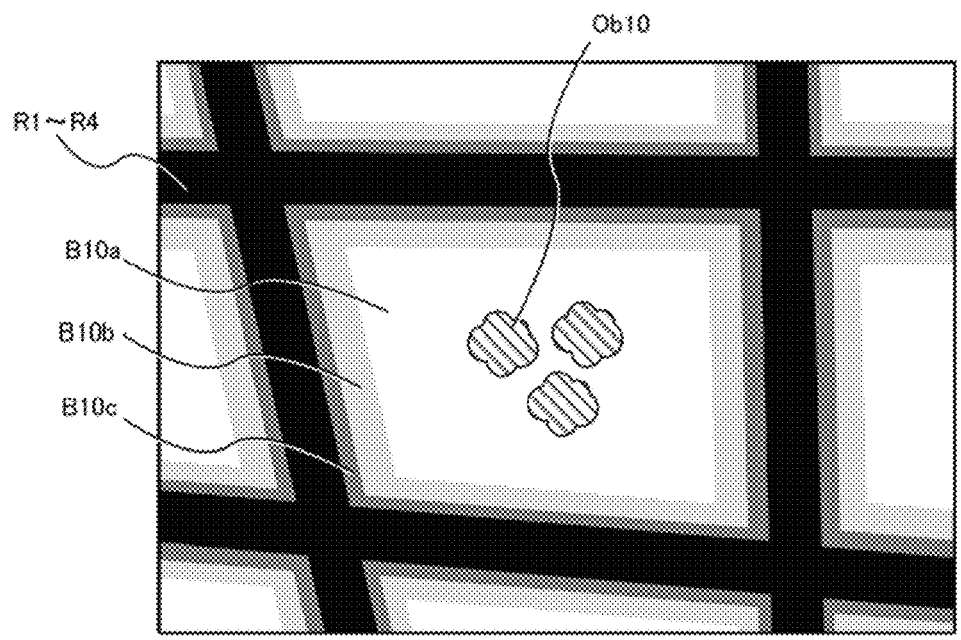
FIG. 17 is an explanatory view for showing the outline of an object arrangement process in accordance with the embodiment.

This automatic object arrangement process makes use of the gradation of stepwise blurred boundary lines in the contour generation image M11 generated by the above contour line extraction process. As has been discussed above, the display data generation unit 146 generates the contour generation image M11 in which boundary lines are blurred in the real map information by blurring color boundaries in the map image of the real map information M1. This contour generation image M11 includes a gradation image formed with such areas B10a to B10c whose color is thinned stepwise, as illustrated in FIG. 17, from black in the roads R1 to R4 to white in the area B10 by blurring the boundaries between the area B10 and the roads R1 to R4. This gradation process is performed, for example, by calculating the average of an arbitrary designated picture element El0 in the real map information and eight picture elements El1 surrounding this picture element El0, and coloring these picture elements with the average color to blur the designated picture element El0 and thereabout as illustrated in FIG. 13A through FIG. 13C.

Then, the object arrangement process is performed by analyzing the contour generation image M11 as gradation image (S501) as illustrated in FIG. 25. The display data generation unit 146 extracts an area having a predetermined density as an object arrangeable area from the contour generation image M11 (S502). Next, with reference to the real map information, background objects Ob10 are arranged in accordance with the attribute of the object arrangeable area (S504). For example, if the attribute of the area indicates a green area such as a forest or a park, trees are arranged as the background objects Ob10.

Incidentally, if the attribute of the area is unknown, any background object can be arranged in accordance with the story of the game progress. By this procedure, as illustrated in FIG. 18, it is possible to automatically arrange, for example, background objects Ob10 such as trees only in the areas B10a having the same color as the original area B10 in the contour generation image M11. As a result, it is possible to automatically arrange objects only near the center of a division such as the area B10 by a simple process of detecting a predetermined density area in the contour generation image M11 without a need for performing complicated arithmetic operations.

Thereafter, objects other than a background, for example, characters, and landmarks and characters required for progressing the game are arranged (S505). Incidentally, these objects other than a background may be arranged in the object arrangeable area in accordance with the attributes of these objects, or arbitrarily arranged irrespective of the object arrangeable area.

Trail Display Process

In the case of the present embodiment, the system is provided with a function to record and display, as a trail on a map, a moving path on which a user or a particular object moves. Also, in accordance with user operation and the progress of a game, the trail which is recorded and displayed can be extended, followed by painting out a blank area. It is possible to place a meaning on this trail display in the game context, for example, by painting out areas on the map along the trail under the concept of "cleansing", "planting", "occupation" or the like. For example, a user can be given an advantage of the game as a score of the user by extending the area that is "cleansed". On the other hand, for example, if an enemy user passes over the trail, this trail is overwritten so that the occupied area passes into the other user's hand, and thereby the diversity and entertainment of the game can be improved.

In the trail display process, the positional information acquisition unit 144 acquires and records the coordinate position of an arbitrary object, and the trail display unit 145a displays the moving path of the user recorded by the moving path recording unit 144a, the moving paths of other users and the moving paths of arbitrary objects on the real map information M1 or the virtual map information M2 as a trail.

Figure 26:
FIG. 26 is an explanatory view for showing a trail display process in accordance with the embodiment.
Figure 27A:
FIG. 27A and FIG. 27B are explanatory views for showing a trail display process in accordance with the embodiment.
Figure 27B:
Figure 28A:
FIG. 28A and FIG. 28B are explanatory views for showing a trail display process in accordance with an exemplary modification of the embodiment.
Figure 28B:

This trail display unit 145a can display a trail by, in the case where a user (smartphone 1a) moves from point A to point B as illustrated in FIG. 26, connecting the sampled positions with the shortest line in time-series order and coloring the determined moving path with a certain width as illustrated in FIG. 27A with hatched lines, or referring to the geographical information to determine the path along the course between two points and coloring the determined path with a certain width as illustrated in FIG. 27B with hatched lines. Furthermore, this trail display unit 145a displays a trail by coloring, as part of the trail, an area or an object in the neighbourhood of the moving path of each user or object on the real map information M1 or the virtual map information M2 as illustrated in FIG. 28A and FIG. 28B.

This area may be displayed by coloring a block as a unit such as an administrative division, a town division, a prefecture, a municipality or the like defined on the basis of the actual geographical information or the virtual geographical information. This block unit coloring may be performed by coloring a block abutting onto the moving path determined by connecting each adjacent points with the shortest line as illustrated in FIG. 28A with hatched lines or a block abutting onto the moving path determined along the course between two points with reference to the geographical information as illustrated in FIG. 28B with hatched lines.

Event Suspending Process

Next is an explanation of the event suspending process. When the user approaches predetermined buildings B1 to B3 in the real map information M1, for example, the game progress processing unit 141 regards that the user approaches or comes upon a predetermined object O1 to O3 such as a monster on the coordinates of the virtual map information M2 in correspondence with the buildings B1 to B3 and performs the event process.

Figure 11:
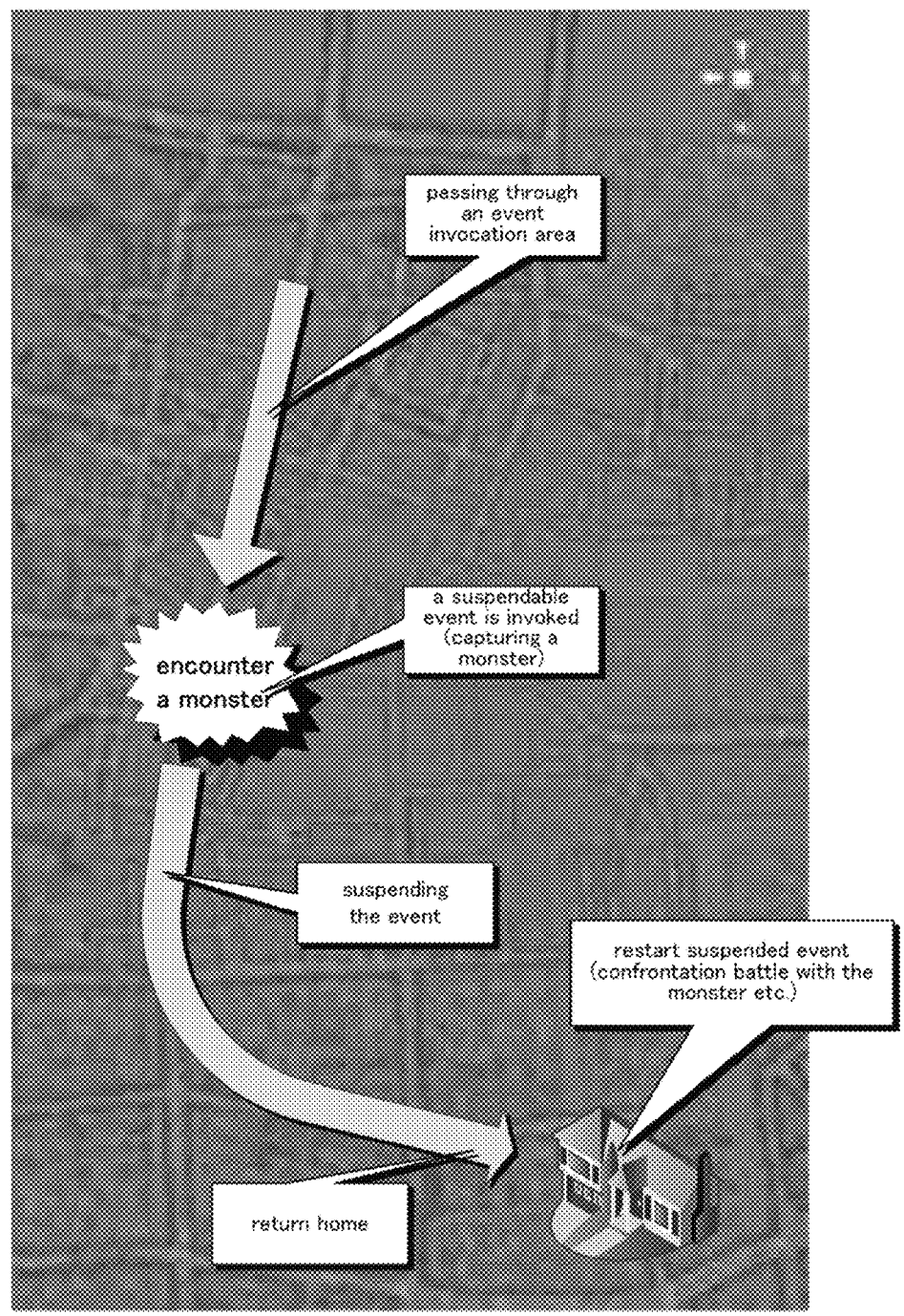
FIG. 11 is an explanatory view for showing an example of the operation of the event suspending process in accordance with the embodiment.

The event process with these objects O1 to O3 may be a confrontation battle with these objects O1 to O3, a mini game or the like. In the case of the present embodiment, after the user encounters a monster while passing an event invocation area to invoke an event process, it is possible to suspend the event process, and start the suspended event process when the user stays a certain place or when the user arrives at home or a destination in order to inhibit the so-called walking while on the smartphone. For example, as illustrated in FIG. 11, in the case where the objects O1 to O3 are virtual life bodies such as monsters or items, a confrontation battle which is a suspendable event process is invoked when the user passes an event invocation area, where these monsters or items appear, and encounters a monster as illustrated in FIG. 11. In this case, the event process is suspended whereas it is assumed that the monster is captured, and the game is progressed in accordance with moving of the user while suspending the event process. When the user comes back home, the event process is restarted to resume the confrontation battle with the monster, a mini game using the item or the like.

Figure 10:
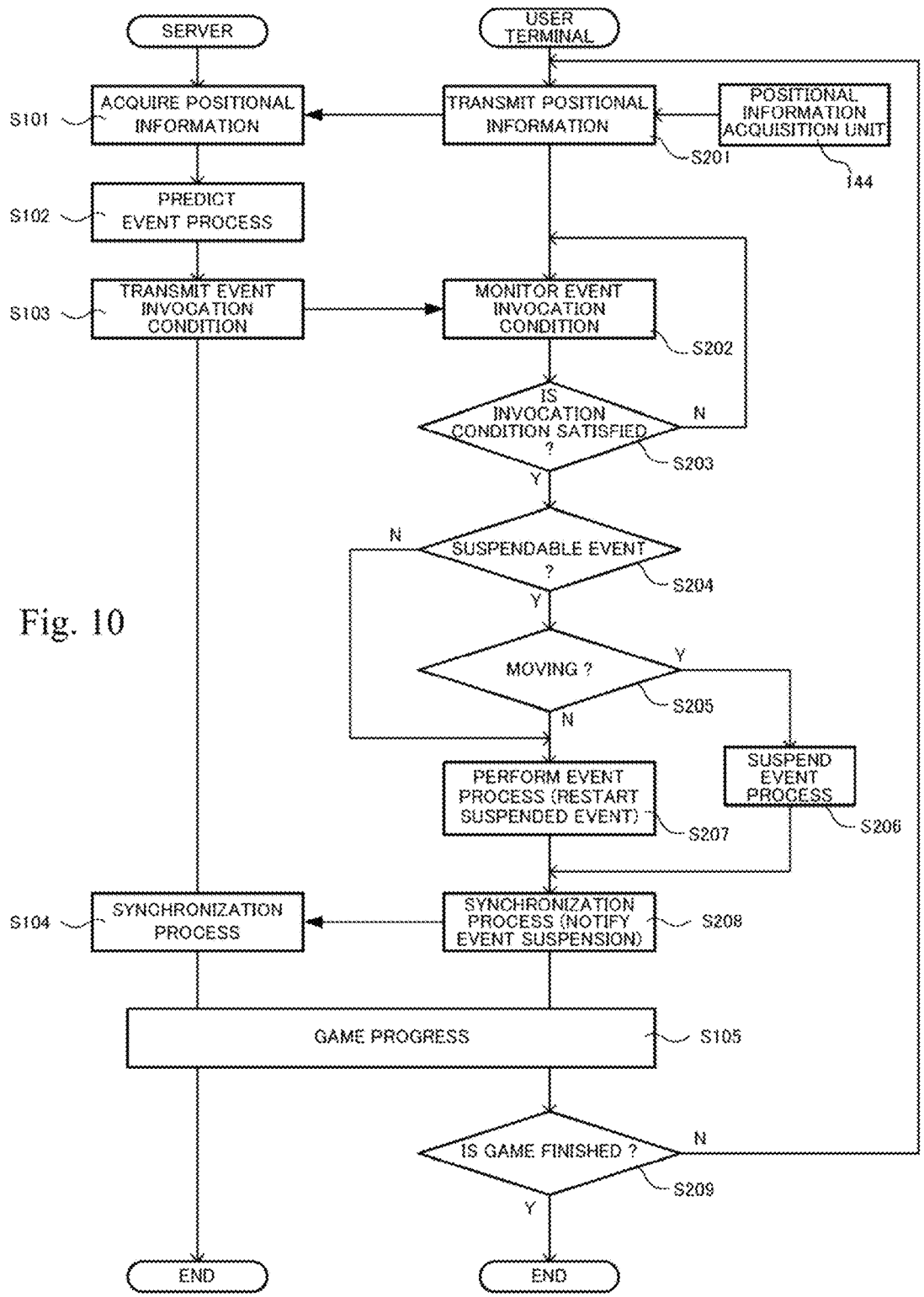
FIG. 10 is a sequence diagram for showing the operation of the event suspending process in accordance with the embodiment.

Such an event suspending process will be specifically explained. FIG. 10 is a sequence diagram for showing the operation of the event suspending process.

First, while progressing the game, positional information is periodically acquired and transmitted to the game server 3 (S201 and S101). The game server 3 predicts an event process to be invoked in accordance with the transmitted current position of each user (S102), and the invocation condition is transmitted to the smartphone 1 (S103).

More specifically speaking, on the basis of the current position of each user acquired by the game server 3, the game progress processing unit 36 of the game server 3 predicts an event process to be invoked on the basis of the positions of the characters of other users and the positions of the objects such as a monster corresponding to a building of the real world map, and generates the invocation condition thereof, which is then transmitted to the smartphone 1.

The smartphone 1 receives this invocation condition by the synchronization processing unit 142, and monitors the timing with which the invocation condition is satisfied (S202). Specifically, the event control unit 143 of the smartphone 1 monitors the invocation condition of an event process and the moving speed of the current position of own device acquired by the positional information acquisition unit 144, and suspends the suspendable event process (S206) if the event process invoked by the game progress processing unit 141 is a predetermined suspendable event process ("Y" in S204), the moving speed of the user is no lower than a predetermined value and the user is moving ("Y" in S205).

Meanwhile, in the case where the event process satisfying the invocation condition is not a suspendable event process ("N" in S204) or where the user is not moving ("N" in S205), the event process is performed as usual (S207). In the case where there is an event process which is suspended, this event process is restarted in step S207. Then, the result (the victory/defeat or score of the battle, mini game or the like) of the event process performed by the game progress processing unit 141 of the smartphone 1 (or the result of the restarted suspended event process) is notified to the game progress processing unit 141 of the game server 3 through the synchronization processing unit 142 of the smartphone 1 (S208), and synchronized with the game server 3 (S104), and reflected in the subsequent game progress process.

On the other hand, in the case where an event process is suspended in step S206, the game progress processing unit 141 can progress the game by invoking another event process (S105) while suspending the event process to be suspended. In this case, the synchronization processing unit 142 notifies the game progress processing unit 141 in the game server 3 side of the event process suspended by the event control unit 143 (S208) to report to the game server 3 that the game is progressed while suspending the event process which satisfies the invocation condition of the event process. Receiving the report of the suspended event process, the game server 3 performs the synchronization process (S104), and reflects the report in the subsequent game progress process (S105).

The above processes are repeated until the game is finished ("N" in S209), and when an operation to terminate the game process is performed ("Y" in S209), the game is finished. Incidentally, even if the application is halted in the smartphone 1 side, the game can be continued in the game server 3 side in order that the event process is automatically suspended and restarted when the application is resumed in the smartphone 1 side.

In accordance with such an event suspending function, it is possible to inhibit the user from performing a complicated operation or steadily watching the display screen for a long time to avoid the danger arising from using a smartphone while walking.

Game Progress Process

The present embodiment is provided with a function to issue points in accordance with the moving distance of a user and progress a game by invoking an event on the basis of the points. The issue of points and the progress of the game are performed by the cooperation of the game progress processing units 36 and 141, and the procedure of game progress and the points are recorded in the user database 35b and the game database 35c.

Figure 29A:
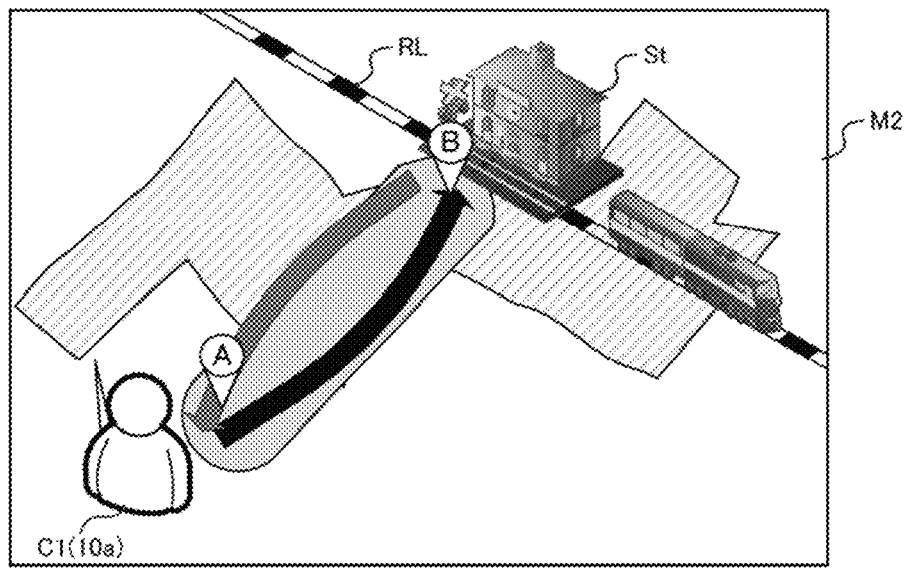
FIG. 29A and FIG. 29B are explanatory views for showing a privilege character in accordance with the embodiment.

Also, in the case of the present embodiment, a privilege event is invoked in accordance with the progress of the game on the basis of the cumulative distance of movement of a user and the number of accessing times to a particular facility on a map, and appearing characters are changed and developed in accordance with the privilege event. For example, as illustrated in FIG. 29A, while the user 10a repeatedly goes back and forth between the home (point A) and the closest station St, for example, for commuting to an office or school, a trail between point A and the station St is recorded by the trail display process.

Figure 29B:
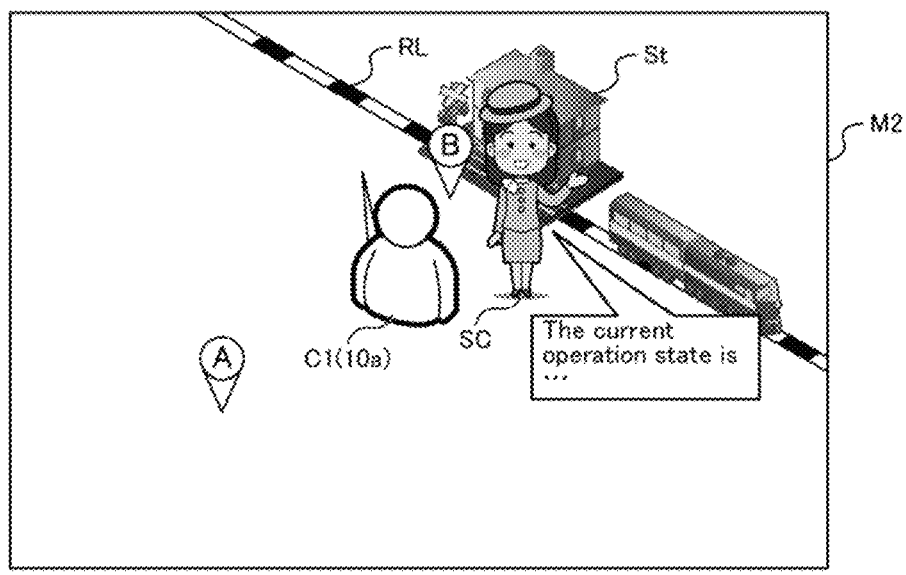

In the case of the present embodiment, the color of the trail for commuting to an office or school is deepened in accordance with the number of traveling times. In addition, the number of accessing times to a particular facility (the station St in this case) is counted by recording this trail, and it becomes possible to make use of a variety of privilege events in accordance with the access frequency or point utilization. In the case of this privilege event, a privilege character, i.e., as illustrated in FIG. 29B for example, automatically appears in accordance with the access frequency.

In the case of the illustrated example, an event is invoked when accessing the closest station St, which is frequently accessed, a predetermined number of times or more, or when using (accumulating) points. Thereafter, each time the user 10a accesses the station St, a guide appears as a privilege character to notify traffic information, and notify, by messages or the like, the current railroad operation state, the weather and traffic information in the business or school place, related news, the event schedule or the like. As this privilege character, a variety of characters can appear in accordance with the characteristics of the facility/area and the time zone, for example, a securities salesman reporting stock prices, a waitress presenting cuisine information of restaurants, a local mascot notifying local news, or the like.

Figure 30:
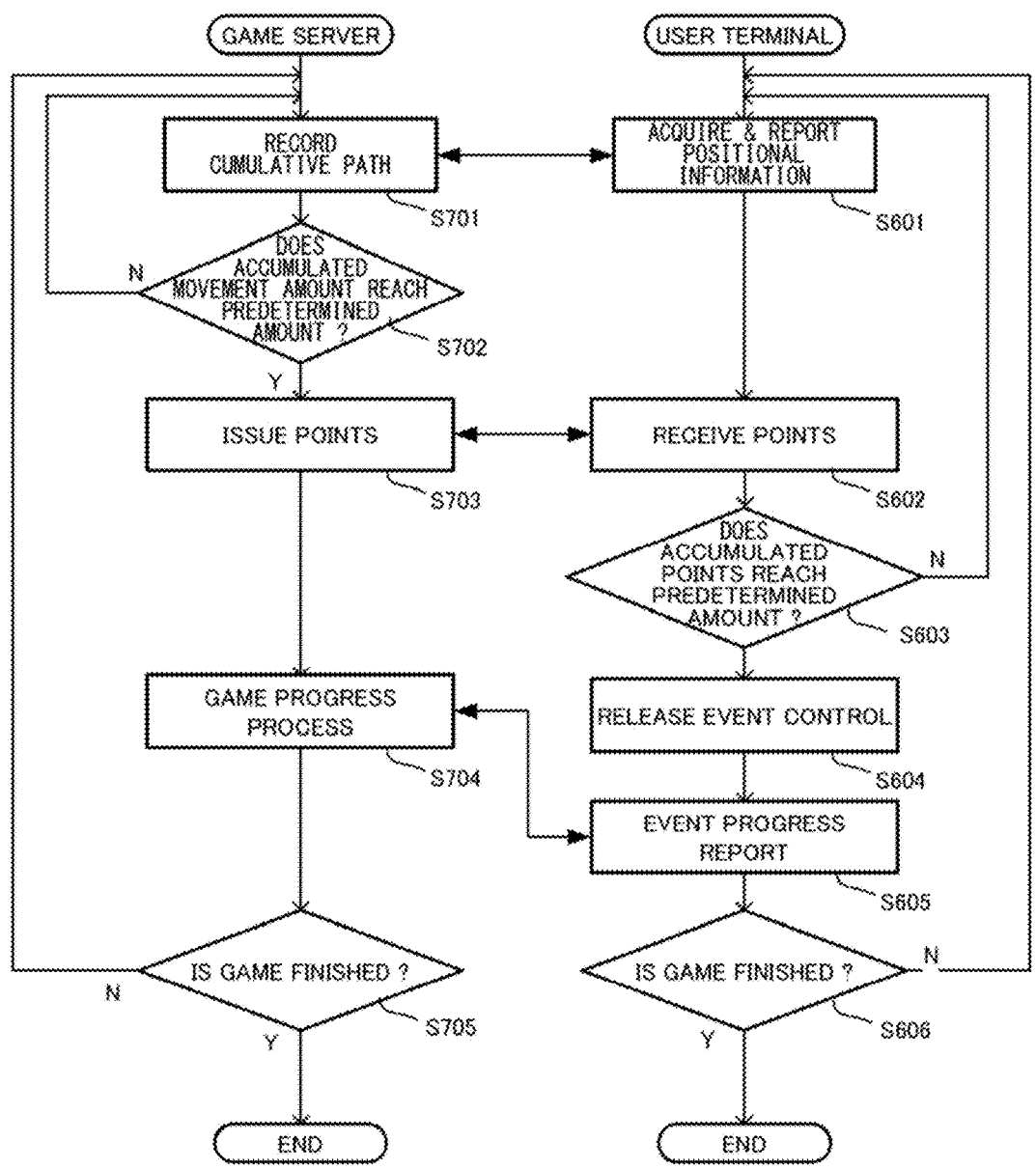
FIG. 30 is a flow chart for showing the procedure of the above point issue process in accordance with the embodiment.

FIG. 30 is a flow chart for showing the procedure of the above point issue process in accordance with the present embodiment. As shown in FIG. 30, during running the game program, the smartphone 1 of the user 1 periodically performs the acquisition process of positional information and the calculation process of the moving speed, and reports the results to the game server 3 (S601). Specifically, the positional information acquisition unit 144 acquires positional information on the basis of the detection value of an acceleration sensor, the displacement of the current position of the user, the latitude and longitude measured by GPS, a base station positioning using triangulation on the basis of the intensities of radio waves transmitted from base stations and information about the base stations, a wifi positioning system using a database of wifi SSID (Service SetID), the degrees of latitude and longitude and the radio wave condition in combination, or the like.

Receiving the report of the positional information from the user terminal, the game server 3 records a cumulative path of each user (S701), and calculates and accumulates the movement amount (cumulative moving distance). The cumulative path is continuously recorded until the accumulated movement amount reaches a predetermined amount ("N" in S702), and when the stored movement amount reaches a predetermined amount ("Y" in S702), points corresponding to the movement amount is issued as value information (S703). The smartphone 1 of the user receives the issued points by downloading or the like (S602).

In the smartphone 1 side of the user, the received points can be saved, used for purchasing items, and so forth. Issuing points is repeated ("N" in S603) until a predetermined amount of points is accumulated, and when the predetermined amount of points is accumulated ("Y" in S603), it becomes possible to use various privilege events. The various privilege events can be selectively used in accordance with the number of points. The user arbitrarily selects an available privilege event which is then performed by a use request operation. This use request operation is performed on the basis of an event control release process in accordance with the number of points.

When the user releases the event control, the event is progressed accordingly (S605), and this fact is reported to the game server 3 (S605). Receiving the report of the event progress, the game system performs a process to progress the game on the basis of the progressed event (S704). It is possible to repeat issuing points, accumulating points and progressing event as described above ("N" in S606 and S705) until the game is finished ("Y" in S606 and S705).

Game Progress Regulation Process

Figure 31:
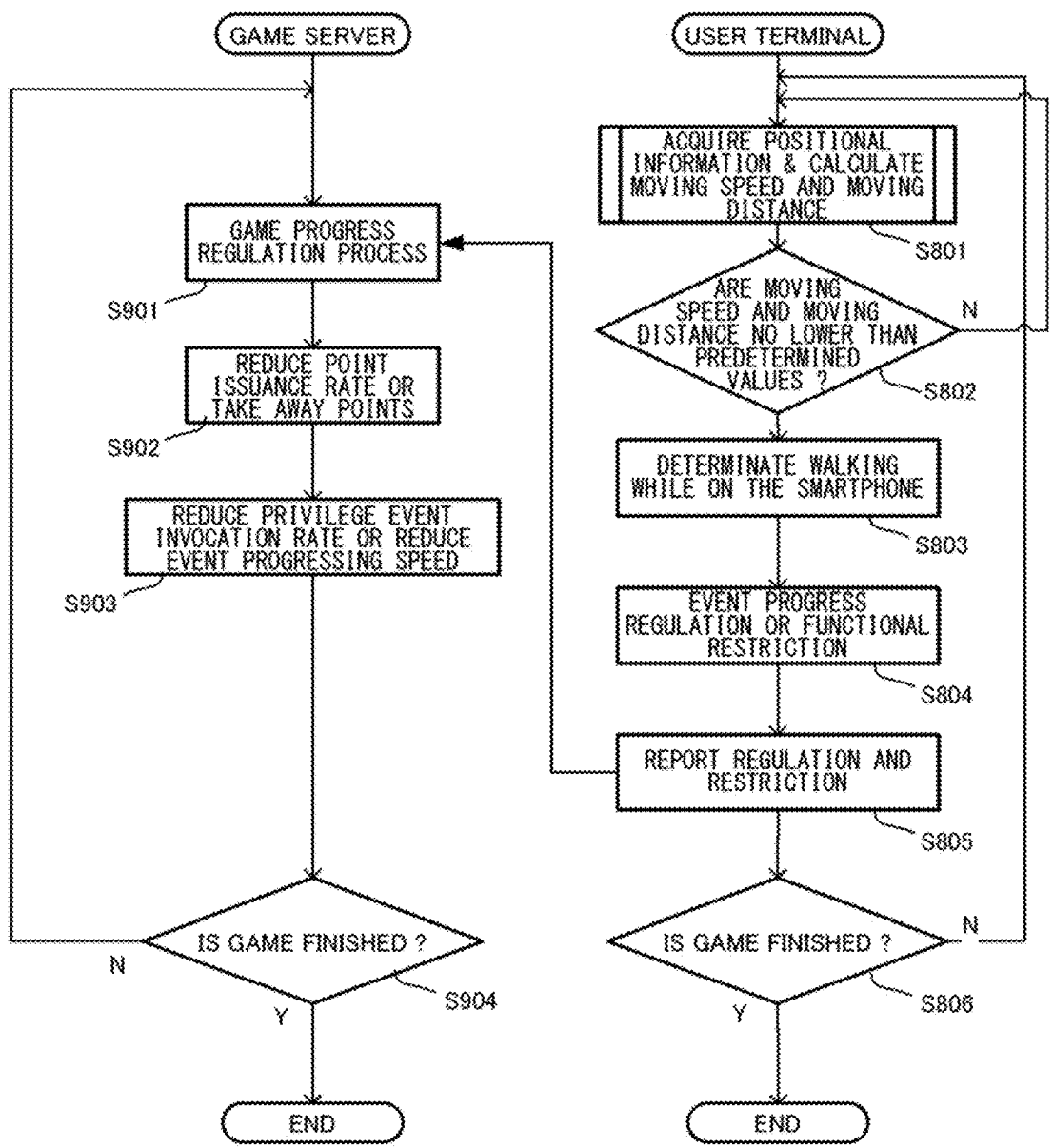
FIG. 31 is a flow chart for showing the procedure of a game progress regulation process in accordance with the embodiment.
Figure 32:
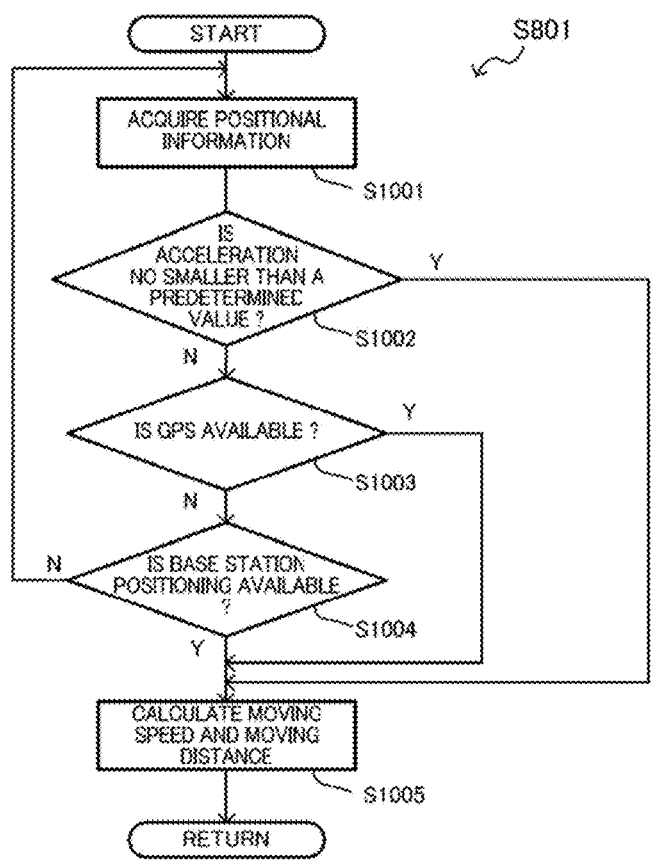
FIG. 32 is a flow chart for showing the procedure of a movement information acquisition process and a moving speed calculation process in accordance with the embodiment.
Figure 33:
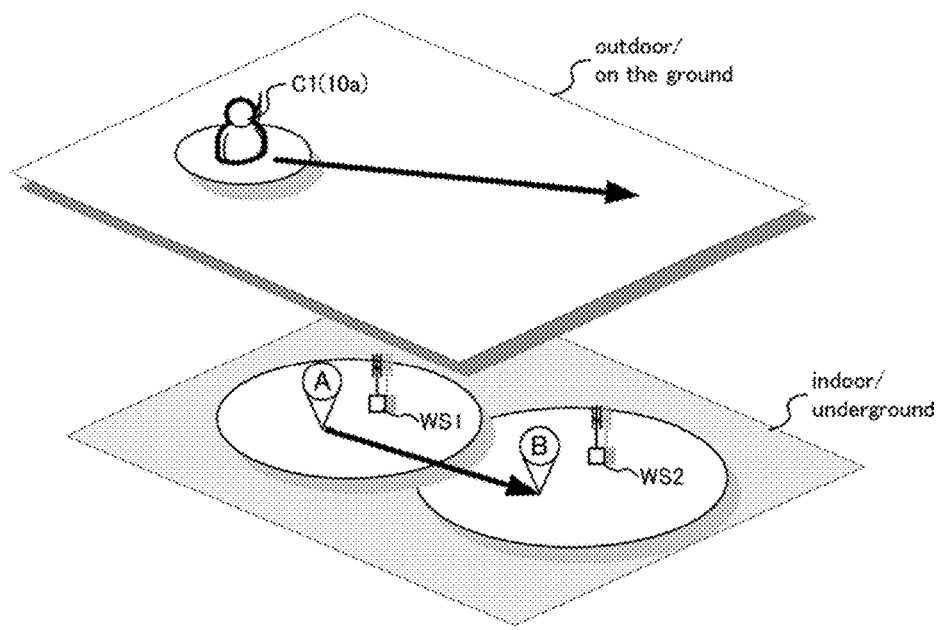
FIG. 33 is an explanatory view for showing an example of the movement information acquisition process and the moving speed calculation process in accordance with the embodiment.

The present embodiment is provided with a function to regulate the progress of the game by detecting the so-called walking while on the smartphone. FIG. 31 is a flow chart for showing the procedure of a game progress regulation process in accordance with the present embodiment. FIG. 32 is a flow chart for showing the procedure of a movement information acquisition process and a moving speed calculation process in accordance with the present embodiment. FIG. 33 is an explanatory view for showing an example of the movement information acquisition process and the moving speed calculation process.

As shown in FIG. 31, during running the game program, the smartphone 1 of a user periodically performs a positional information acquisition process and the moving speed calculation process (S801). Specifically describing the positional information acquisition process and the moving speed calculation process in step S801, as shown in FIG. 32, first, various detection values are acquired as positional information (S1001). Specifically, the positional information acquisition unit 144 acquires positional information on the basis of the detection value of an acceleration sensor, the displacement of the current position of the user, the latitude and longitude measured by GPS, a base station positioning using triangulation on the basis of the intensities of radio waves transmitted from base stations and information about the base stations, a wifi positioning system using a database of wifi SSID (Service SetID), the degrees of latitude and longitude and the radio wave condition in combination, or the like.

Of the positional information acquired in step S1001, the value of the detection signal from the acceleration sensor installed in the smartphone 1 is compared with a predetermined threshold value, and it is determined whether or not acceleration is no smaller than a predetermined value (S1002). When the acceleration is no smaller than a predetermined value ("Y" in step S1002), a moving speed and a moving distance are calculated from the detection value of the acceleration (S1005), and the calculated values are supplied to step S802 in FIG. 31. For example, when the user 10a starts walking after standing still on the ground or out of doors as illustrated in FIG. 33, the movement of the user can be detected with reference to the acceleration when starting walking.

On the other hand, when the acceleration is smaller than the predetermined value ("N" in step S1002), for example, the user may move at a constant speed by a vehicle so that it is needed to analyze another detection value such as a GPS signal. Nevertheless, as illustrated in FIG. 33, when the user stays under the ground such as a train station of a subway, or indoors such as in a building, a GPS signal may not be received. For this reason, it is determined whether or not a GPS signal can be received (S1003). when a GPS signal can be received ("Y" in step S1003), a moving speed and a moving distance are calculated from the change in the latitude and longitude of the GPS signal (S1005) followed by supplying the calculated values to step S802 of FIG. 31.

On the other hand, when a GPS signal cannot be received ("N" in step S1003), it is determined whether or not base station positioning is available (S1004). If base station positioning is available ("Y" in step S1004), the change in the base station positioning, for example, handover when switching from one wifi base station WS1 to another wifi base station WS2 is detected. Namely, when switching from one wifi base station WS1 to another wifi base station WS2, a discontinuity point is detected in the positioning process so that the current position can instantaneously move several meters, and a moving speed and a moving distance are calculated across this discontinuity point (S1005) followed by supplying the calculated values to step S802 of FIG. 31. Incidentally, if any piece of the positional information acquired in step S1001 cannot be used to perform the positioning process ("N" in step S1004), the steps S1001 to S1004 after acquiring positional information are repeated in a loop process until the positioning process becomes viable.

Returning to FIG. 31, in step S802, it is determined whether or not the moving speed and the moving distance calculated in step S801 are no lower than predetermined values. Specifically, it is determined whether or not the moving speed and the moving distance calculated in step S801 are no lower than those of usual movement during walking. If the user moves faster and greater than during usual walking ("Y" in step S802), it is determined that the user is walking while on the smartphone (S803). Meanwhile, in the case where base station positioning is used to calculate the moving speed and the moving distance in step S801, it is predicted in determination of step S802 that the user will be still moving for a predetermined time (for example, about five minutes) after movement is determined, and the determination of the walking while on the smartphone is temporarily suspended. This suspending time is readily set in accordance with the distance between base stations and the change amount of radio waves. If the user is determined as moving even after this suspending time elapses, the determination in step S803 is performed.

When the walking while on the smartphone is determined in step S803, event progress regulation and functional restriction are performed in accordance with this determination (S804). The event progress regulation and functional restriction in the smartphone 1 side of the user are reported to the game server 3 (S805), the game server 3 receiving this report performs a process for regulating the game progress (S901). In the case of the present embodiment, it is performed as the game progress regulation to reduce the point issuance rate in a predetermined period thereafter, and take away points which have been already issued (S902). Also, the game progress is regulated to become slower by reducing the invocation rates of privilege events and the event progressing speed (S903). The above process of monitoring the walking while on the smartphone and the game progress regulation are repeatedly performed ("N" in S806 and S904) until the game is finished ("Y" in S806 and S904).

Effect/Action

As has been discussed above, in accordance with the present embodiment, for a game system which performs various event processes to progress a game in a virtual world where characters corresponding to users and other objects move, it is possible to improve the operability of switching a map display between the real world and a virtual world and the entertainment property of the game, and avoid the danger arising from using a smartphone while walking.

EXPLANATION OF SYMBOLS

B1~B3 . . . building
C1 . . . character
M1 . . . real map information
M11 . . . contour generation image
M12 . . . contour line extraction image
M2 . . . virtual map information
M22, M23 . . . low resolution map
M22a, M23a . . . boundary area
O1~O3 . . . object
Ob10 . . . background object
SC . . . privilege character
W1 . . . real display data
W2 . . . virtual display data
1 (1a, 1b) . . . smartphone
2 . . . Internet
3 . . . game server
10a, 10b . . . user
11 . . . communication interface
12 . . . input interface
12a . . . touch panel
13 . . . output interface
13a . . . display unit
14 . . . application running unit
15 . . . memory
21 . . . satellite
22 . . . wireless base station
31 . . . communication interface
32 . . . positional information management unit
33 . . . authentication unit
34 . . . game data delivering unit
35a . . . real map database
35b . . . user database
35c . . . game database
36 . . . game progress processing unit
37 . . . virtual map information management unit
141 . . . game progress processing unit
142 . . . synchronization processing unit
143 . . . event control unit
144 . . . positional information acquisition unit
145 . . . display control unit
146 . . . display data generation unit

The invention claimed is:

1. A game system which invokes various event processes to progress a game in a virtual world where a character corresponding to a user and other objects move, comprising:
a game progress processing unit which progresses the game by invoking the various event processes;
a real map storage unit which stores real map information containing geographical information in a real world;
a virtual map information generation unit which generates virtual map information including coordinate information of the objects on virtual geographical information corresponding to the geographical information on the real map information in accordance with a game progress by the game progress processing unit;
a positional information acquisition unit which acquires a current coordinate position of the user and a displacement thereof in the real world;
a real display data generation unit which generates real display data indicating the coordinate position selected by the positional information acquisition unit on the real map information on the basis of the current coordinate position of the user and the displacement thereof;
a virtual display data generation unit which generates virtual display data showing the character on the virtual map information corresponding to the coordinate position acquired by the positional information acquisition unit on the basis of the coordinate position; and
a display control unit which displays both or selected one of the virtual display data generated by the virtual display data generation unit and the real display data generated by the real display data generation unit, or displays part of either one overlapping the other, wherein the game progress processing unit regulates the progress of the game in accordance with movement of the coordinate position.

2. The game system of claim 1 wherein the game progress processing unit gives value information to the user in accordance with progress of the game, and wherein the game progress processing unit reduces a given value of the value information or an opportunity of giving the value information, or takes away the value information which have been given.

3. The game system of claim 1 wherein the display control unit regulates the display of the real display data and/or the virtual display data or the operation of displaying the same in accordance with regulation of the progress of the game by the game progress processing unit.

4. The game system of claim 1 further comprising: an event control unit which monitors the event process invoked by the game progress processing unit and the moving speed of the current position acquired by the positional information acquisition unit, and suspends a predetermined suspendable event process when the moving speed of the current position is no lower than a predetermined value and when the event process invoked by the game progress processing unit is the suspendable event process, wherein the game progress processing unit progresses the game by invoking another event process while suspending the event process to be suspended.

5. The game system of claim 2 wherein the value information is a right to acquire privilege information associated with any of a predetermined coordinate position, an area or a route on the real map information or the virtual map information, and wherein the condition for acquiring the privilege information is that the frequency of accessing the any of the predetermined coordinate position, the area or the route is no smaller than a predetermined value.

6. A game program for use in a game system which performs various event processes to progress a game in a virtual world where a character corresponding to a user and other objects move, and for causing a mobile terminal device used by the user to function as:

a game progress processing unit which progresses the game by invoking the various event processes;

a real map storage unit which stores real map information containing geographical information in a real world;

a virtual map information generation unit which generates virtual map information including coordinate information of the objects on virtual geographical information corresponding to the geographical information on the real map information in accordance with a game progress by the game progress processing unit;

a positional information acquisition unit which acquires a current coordinate position of the user and a displacement thereof in the real world;

a real display data generation unit which generates real display data indicating the coordinate position selected by the positional information acquisition unit on the real map information on the basis of the current coordinate position of the user and the displacement thereof;

a virtual display data generation unit which generates virtual display data showing the character on the virtual map information corresponding to the coordinate position acquired by the positional information acquisition unit on the basis of the coordinate position; and a display control unit which displays both or selected one of the virtual display data generated by the virtual display data generation unit and the real display data generated by the real display data generation unit, or displays part of either one overlapping the other, wherein the game progress processing unit regulates the progress of the game in accordance with movement of the coordinate position.

7. The game program of claim 6 wherein the game progress processing unit gives value information to the user in accordance with progress of the game, and wherein the game progress processing unit reduces a given value of the value information or an opportunity of giving the value information, or takes away the value information which have been given.

8. The game program of claim 6 wherein the display control unit regulates the display of the real display data and/or the virtual display data or the operation of displaying the same in accordance with regulation of the progress of the game by the game progress processing unit.

9. The game program of claim 6 for causing the mobile terminal device to function further as:

an event control unit which monitors the event process invoked by the game progress processing unit and the moving speed of the current position acquired by the positional information acquisition unit, and suspends a predetermined suspendable event process when the moving speed of the current position is no lower than a predetermined value and when the event process invoked by the game progress processing unit is the suspendable event process, wherein the game progress processing unit progresses the game by invoking another event process while suspending the event process to be suspended.

10. The game program of claim 7 wherein the value information is a right to acquire privilege information associated with any of a predetermined coordinate position, an area or a route on the real map information or the virtual map information, and wherein the condition for acquiring the privilege information is that the frequency of accessing the any of the predetermined coordinate position, the area or the route is no smaller than a predetermined value.

* * * * *